US012260725B2

(12) United States Patent
Washizu et al.

(10) Patent No.: US 12,260,725 B2
(45) Date of Patent: Mar. 25, 2025

(54) FIRE DETECTION APPARATUS

(71) Applicant: HOCHIKI Corporation, Tokyo (JP)

(72) Inventors: Keisuke Washizu, Tokyo (JP); Hiroki Masuzawa, Tokyo (JP)

(73) Assignee: HOCHIKI Corporation, Tokyo (JP)

( * ) Notice: Subject to any disclaimer, the term of this patent is extended or adjusted under 35 U.S.C. 154(b) by 49 days.

(21) Appl. No.: 18/237,460

(22) Filed: Aug. 24, 2023

(65) Prior Publication Data

US 2023/0401947 A1 Dec. 14, 2023

Related U.S. Application Data

(63) Continuation-in-part of application No. PCT/JP2022/000541, filed on Jan. 11, 2022.

(51) Int. Cl.
*G08B 17/107* (2006.01)
*G08B 17/113* (2006.01)

(52) U.S. Cl.
CPC .......... *G08B 17/107* (2013.01); *G08B 17/113* (2013.01)

(58) Field of Classification Search
None
See application file for complete search history.

(56) References Cited

U.S. PATENT DOCUMENTS 6,195,014 B1 * 2/2001 Sakurai ................ G08B 17/113 340/630
7,733,234 B2 * 6/2010 Montgomery ......... G08B 17/12 340/584

(Continued)

FOREIGN PATENT DOCUMENTS

EP 2109085 A2 10/2009
EP 2402920 A2 1/2012

(Continued)

OTHER PUBLICATIONS

International Search Report from International Application No. PCT/JP2022/000541 mailed Mar. 22, 2022, all pages cited in its entirety.

(Continued)

*Primary Examiner* — Muhammad Adnan
(74) *Attorney, Agent, or Firm* — Burr & Forman LLP

(57) ABSTRACT

Provided is a sensor 100 provided with a detection element 700 for detecting heat of a heat air current generated in association with a fire in a monitoring area, in which the detection element 700 is disposed so that a detector protrudes from a predetermined base portion of the sensor 100, the sensor 100 includes a control structure that has a stepped portion higher than the predetermined base portion, the control structure being configured to guide the heat air current to the detector of the detection element 700 along an outer peripheral wall of the stepped portion, at least a part of the detector of the detection element 700 is located on a base portion side lower than the uppermost step of the stepped portion, a labyrinth portion guides the heat air current to the detector of the detection element 700 along a side end portion corresponding to an outer peripheral side of the stepped portion of a plurality of partition walls, and the heat air current containing smoke introduced into the labyrinth portion is introduced to the smoke detector disposed in a lower part of the control structure via an opening penetrating the stepped portion of the control structure from an upper surface to a lower surface side.

5 Claims, 19 Drawing Sheets

(56) References Cited

U.S. PATENT DOCUMENTS

| | | | | |
|---|---|---|---|---|
| 2006/0007009 | A1 | 1/2006 | Hess et al. | |
| 2009/0243835 | A1 | 10/2009 | Katou et al. | |
| 2010/0073926 | A1 * | 3/2010 | Kudoh | G08B 29/08 250/352 |
| 2011/0068936 | A1 * | 3/2011 | Shimada | G08B 17/10 73/204.22 |
| 2013/0008787 | A1 * | 1/2013 | Mammoto | G08B 17/00 204/415 |
| 2019/0147717 | A1 * | 5/2019 | Shimazu | G08B 17/06 340/628 |
| 2020/0134999 | A1 * | 4/2020 | Shimadzu | G08B 17/113 |
| 2020/0160688 | A1 * | 5/2020 | Shimadzu | G01N 21/01 |
| 2020/0388127 | A1 * | 12/2020 | Lee | G01N 21/532 |
| 2021/0041350 | A1 * | 2/2021 | Takano | G08B 17/113 |
| 2021/0255101 | A1 * | 8/2021 | Shimadzu | G01N 21/53 |
| 2022/0268682 | A1 * | 8/2022 | Chu | G08B 29/18 |
| 2022/0358820 | A1 * | 11/2022 | Muro | G08B 17/10 |
| 2023/0221185 | A1 * | 7/2023 | Washizu | G08B 17/06 374/208 |
| 2023/0228670 | A1 | 7/2023 | Takano et al. | |
| 2023/0237885 | A1 * | 7/2023 | Washizu | G08B 17/06 340/540 |
| 2023/0290237 | A1 * | 9/2023 | Washizu | G08B 17/06 |
| 2023/0417665 | A1 * | 12/2023 | Washizu | G01N 21/53 |
| 2024/0139570 | A1 * | 5/2024 | Fujiwara | G08B 29/183 |

FOREIGN PATENT DOCUMENTS

| | | | |
|---|---|---|---|
| EP | 2472486 | A1 | 7/2012 |
| JP | H08-153287 | A | 6/1996 |
| JP | 2009211613 | A | 9/2009 |
| JP | 2009245110 | A | 10/2009 |
| JP | 2012014330 | A | 1/2012 |
| JP | 2020113030 | A | 7/2020 |
| JP | 2021162937 | A | 10/2021 |

OTHER PUBLICATIONS

Supplementary European Search Report issued in corresponding European Patent Application No. 22920169 mailed Aug. 16, 2024, all pages cited in its entirety.

Written Opinion issued in corresponding European Patent Application No. 22920169.4 mailed Aug. 16, 2024, all pages cited in its entirety.

* cited by examiner

[Fig. 1]
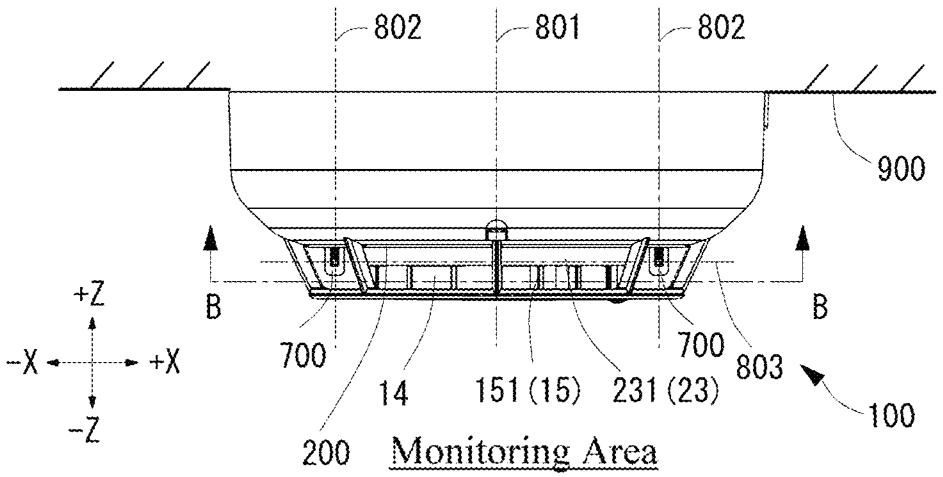
[Fig. 2]
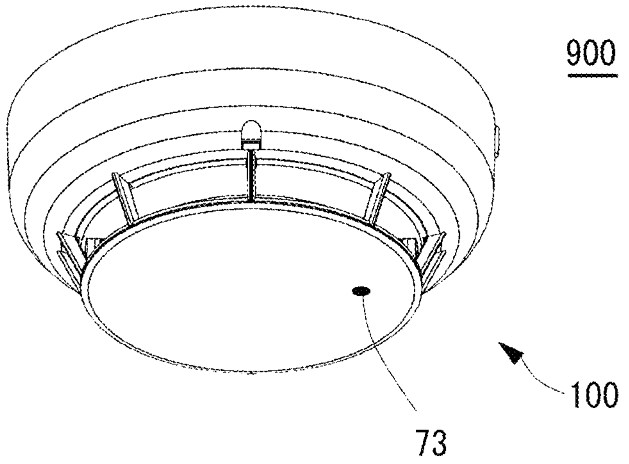

[Fig. 3]
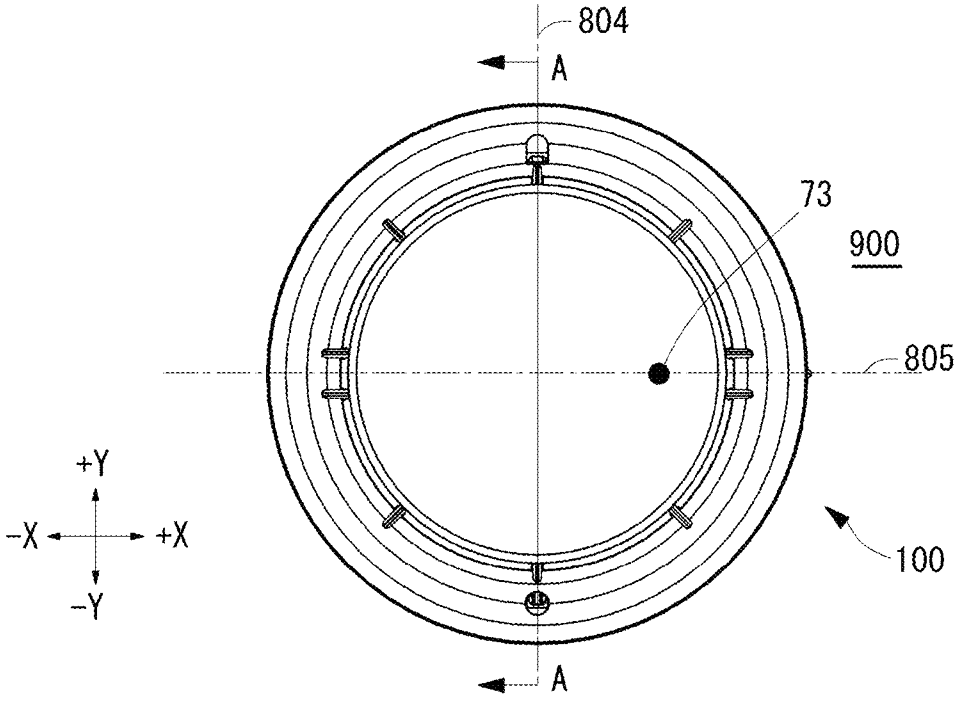
[Fig. 4]
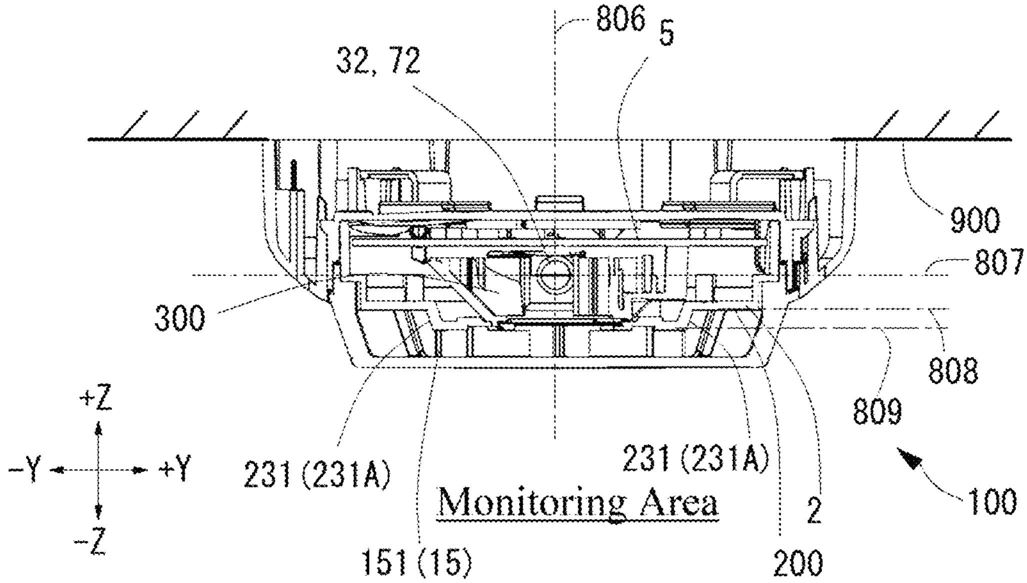

[Fig. 5]
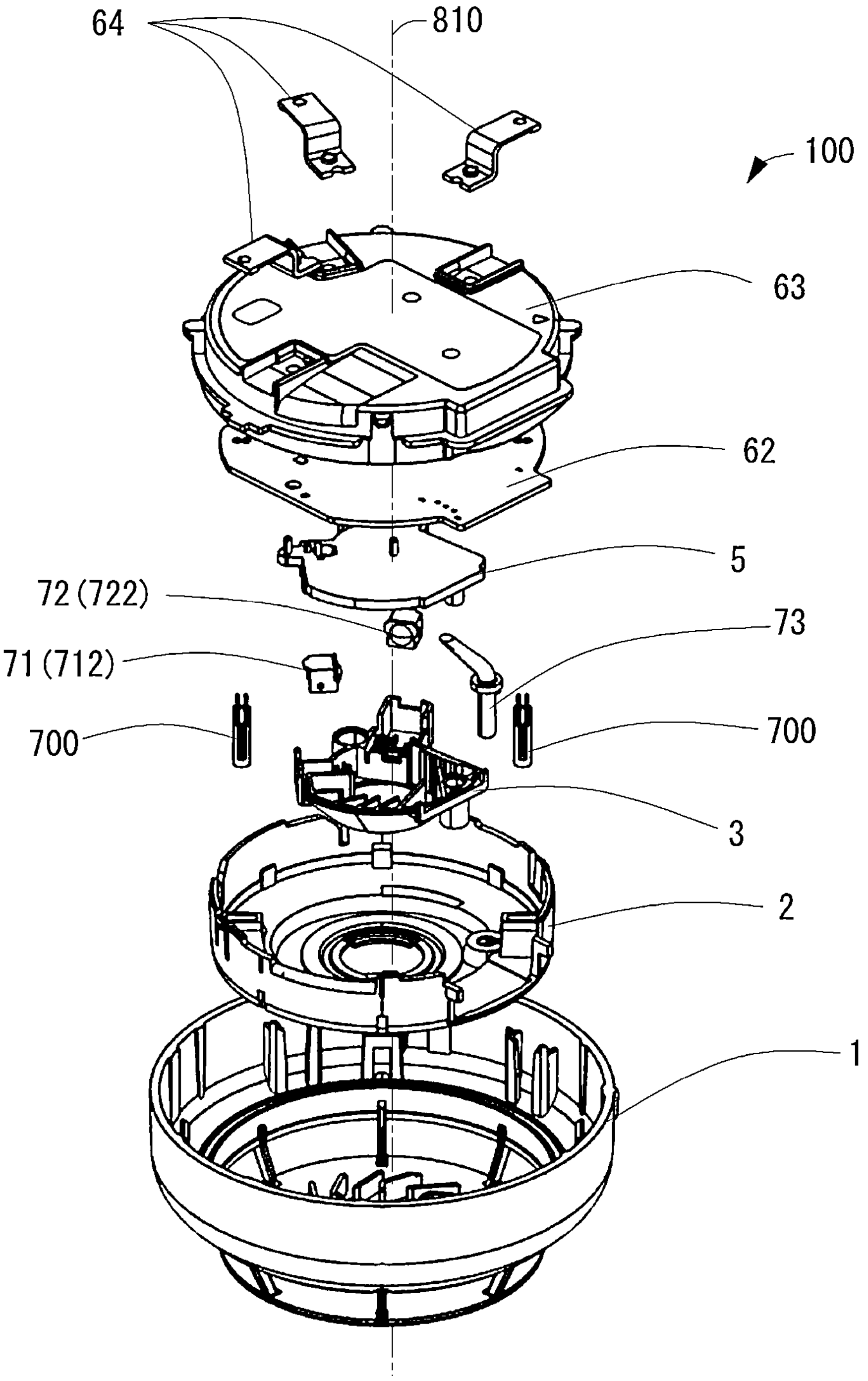

[Fig. 6]
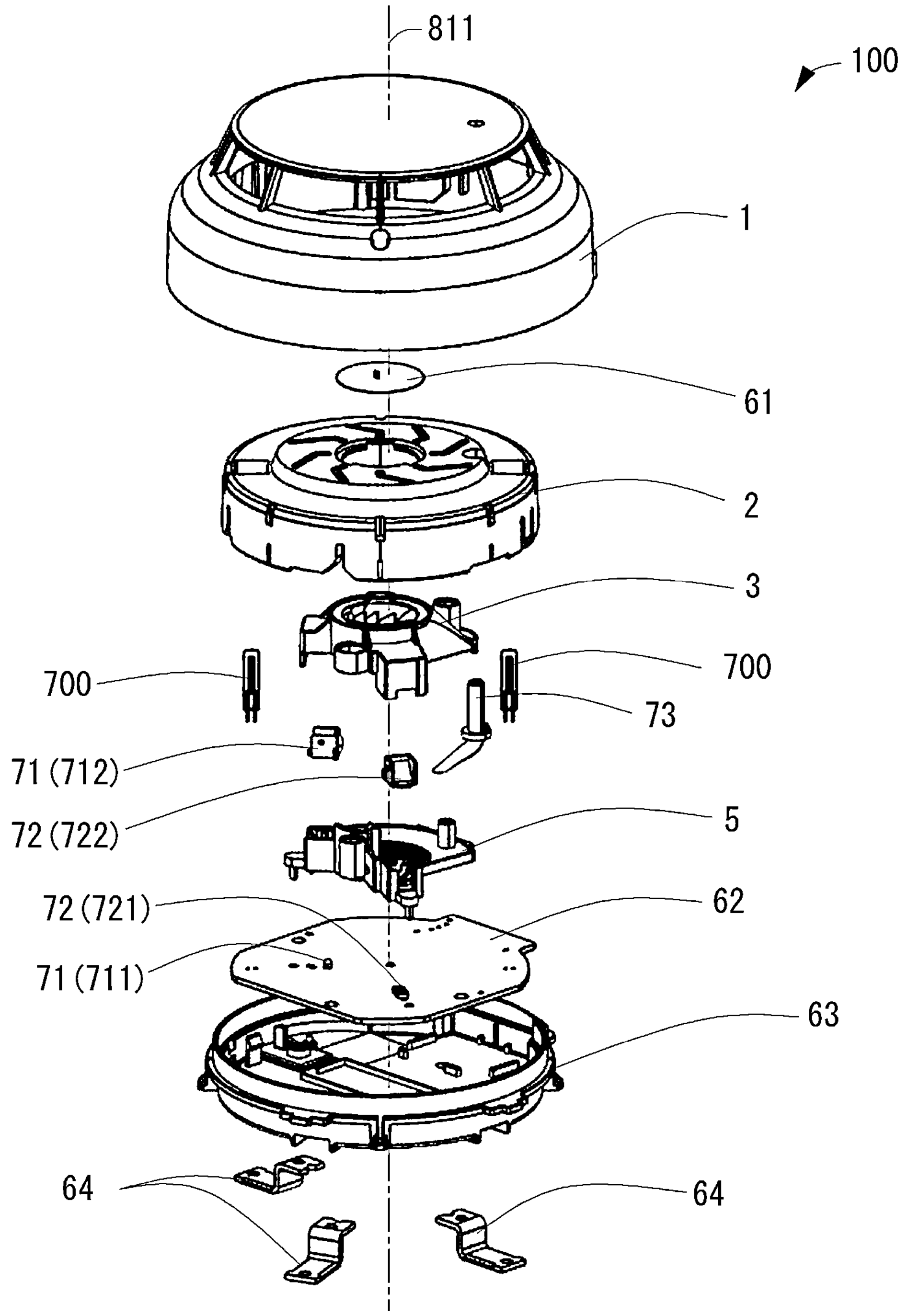

[Fig. 7]
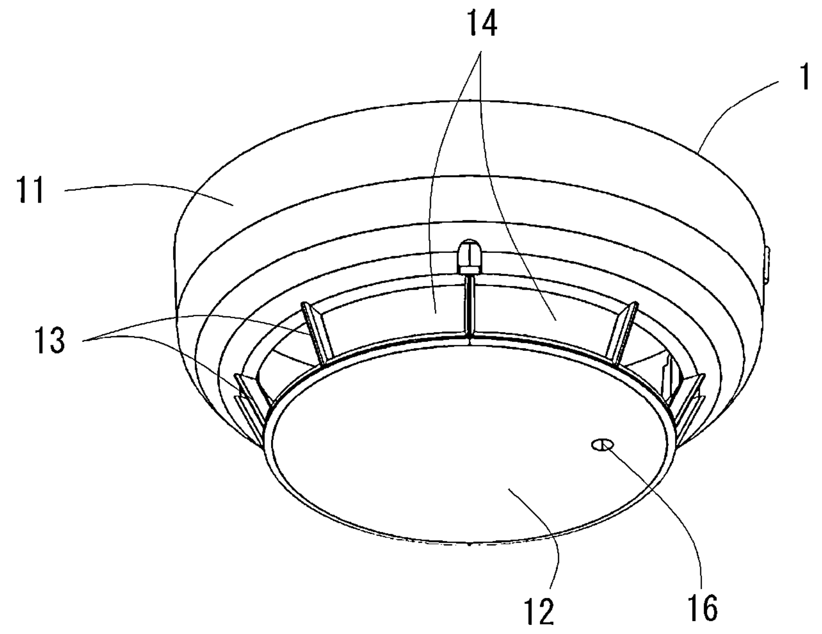
[Fig. 8]
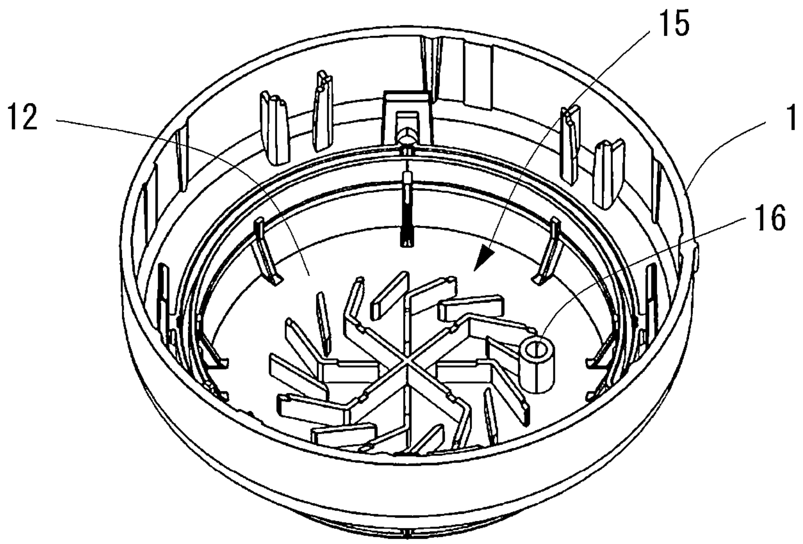

[Fig. 9]
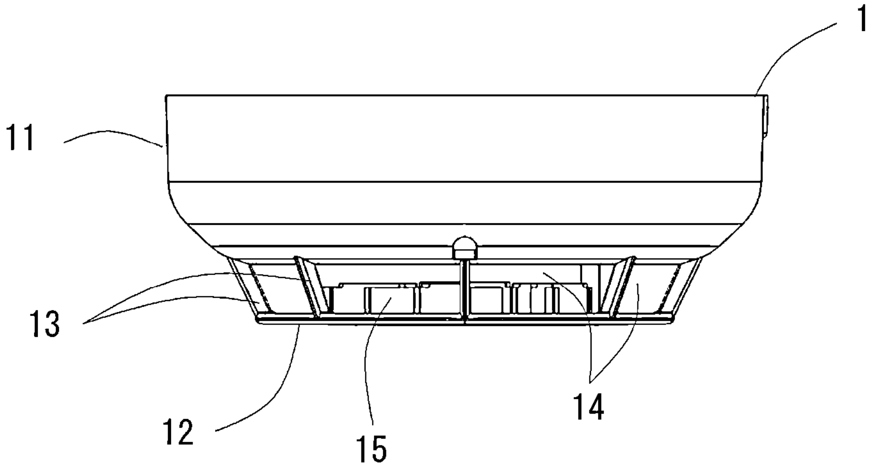
[Fig. 10]
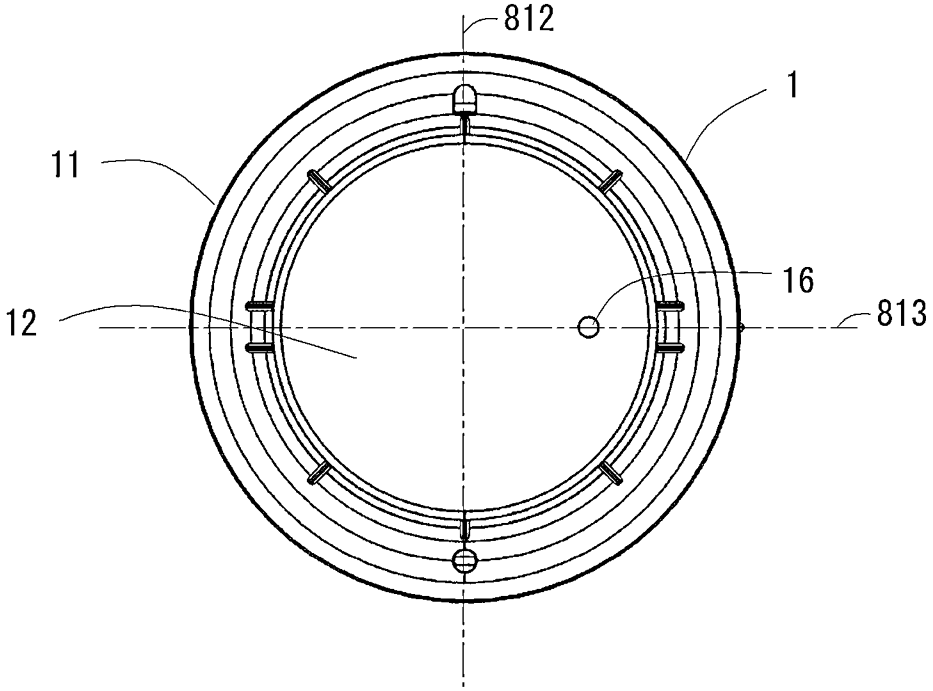

[Fig. 11]
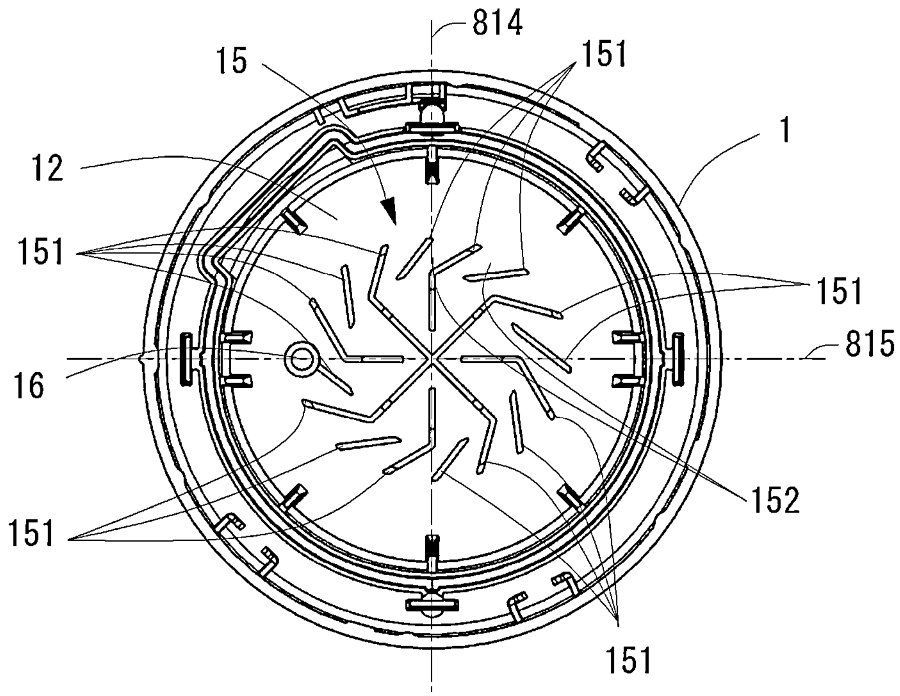
[Fig. 12]
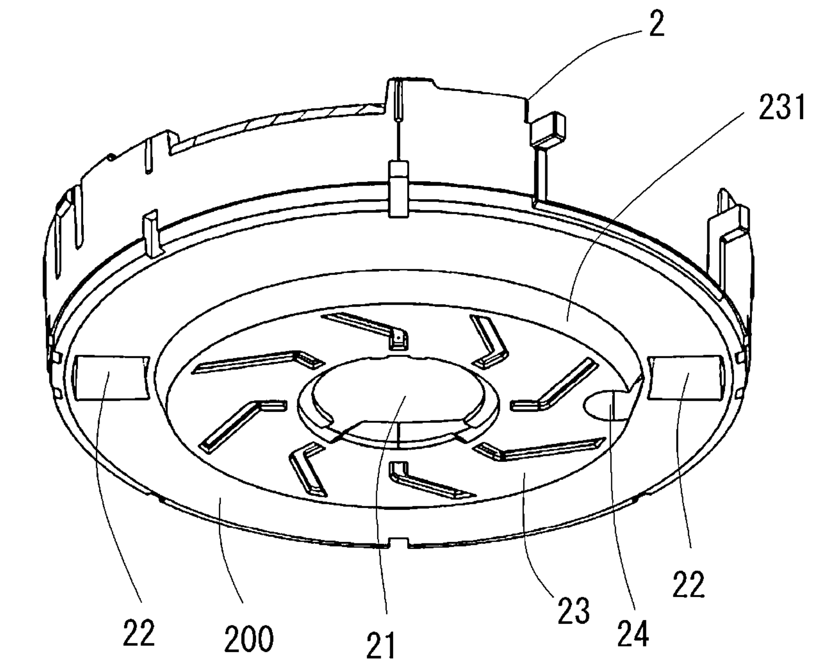

[Fig. 13]
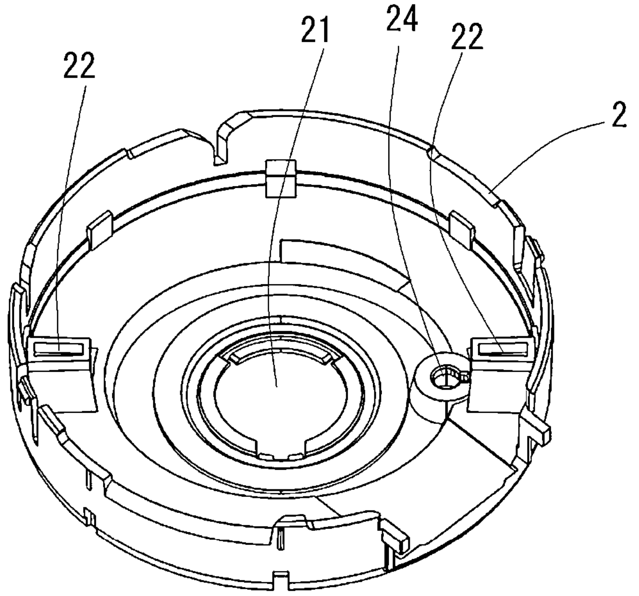
[Fig. 14]
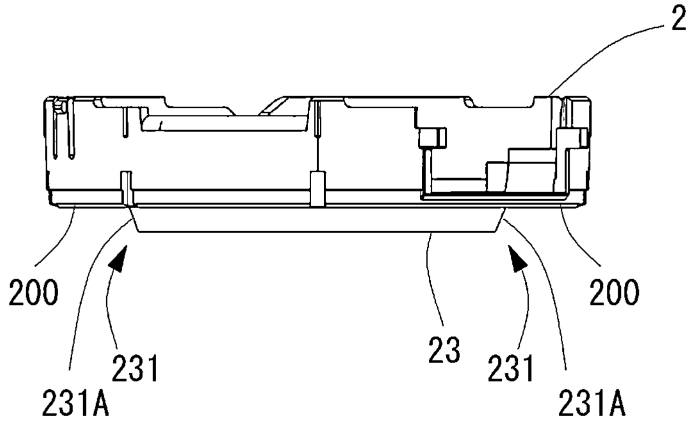

[Fig. 15]
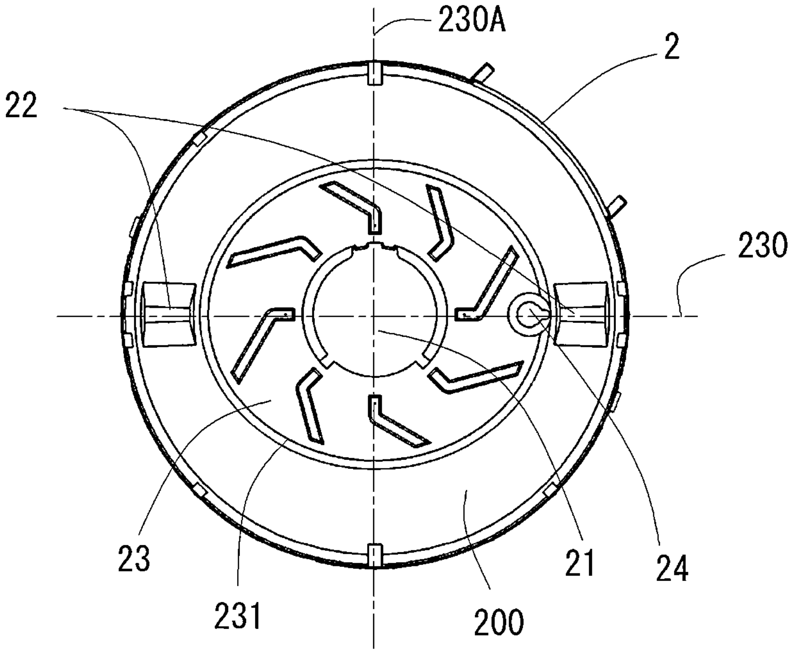
[Fig. 16]
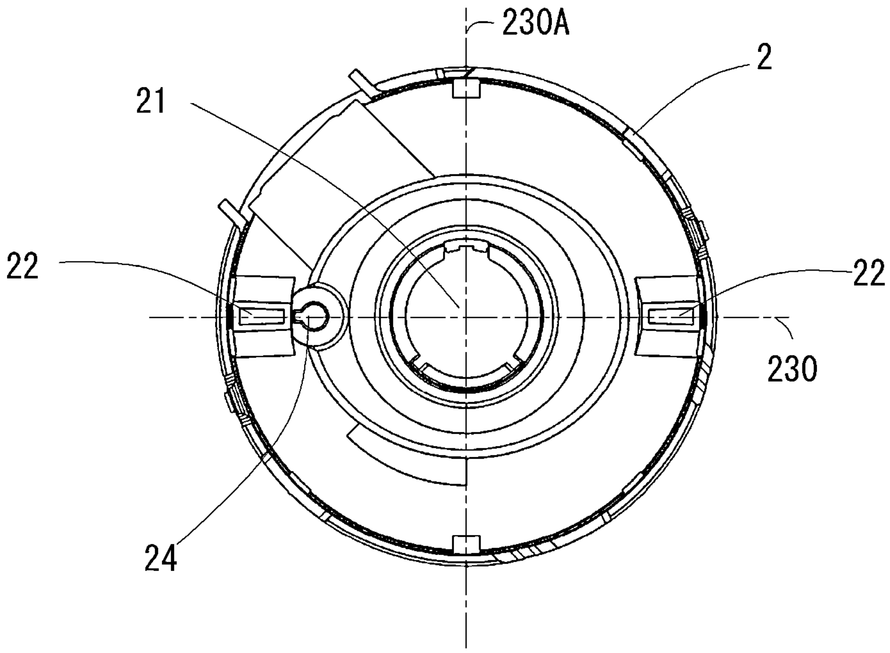

[Fig. 17]
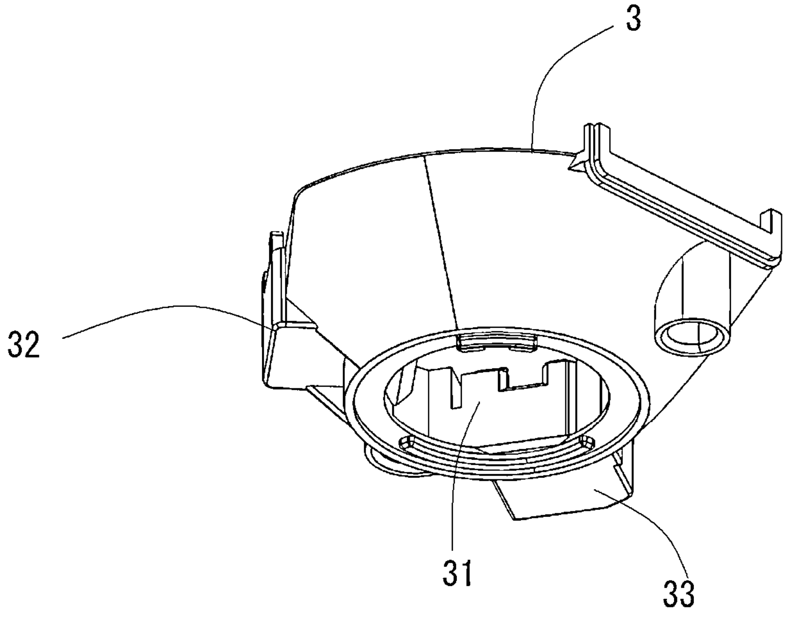
[Fig. 18]
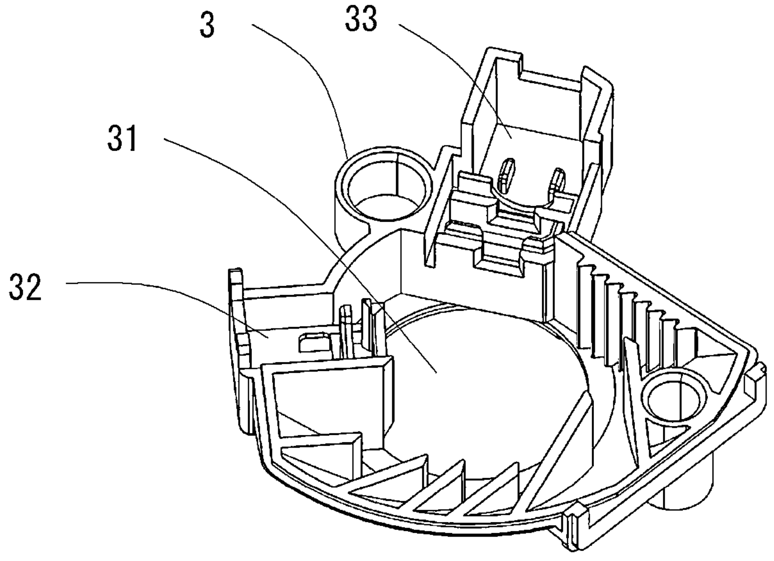

[Fig. 19]
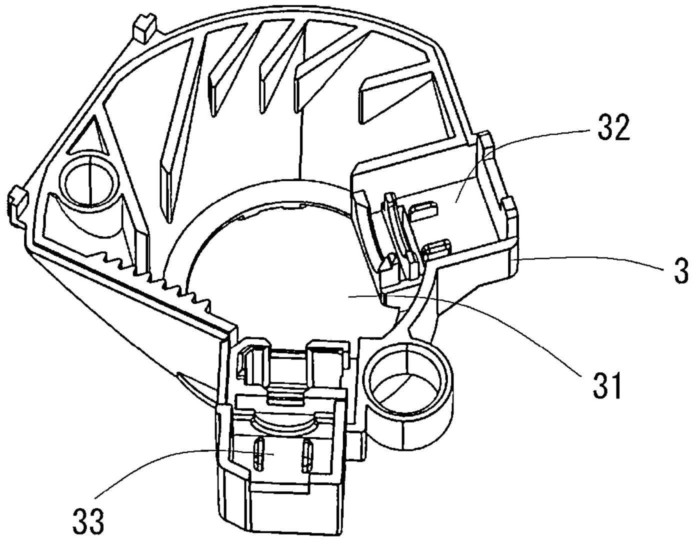
[Fig. 20]
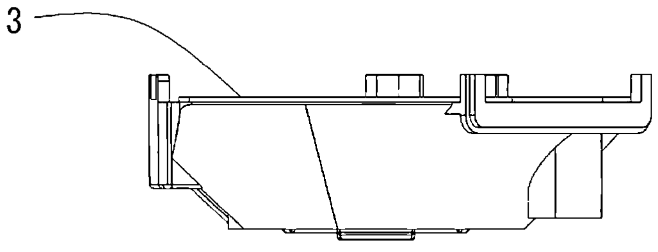

[Fig. 21]
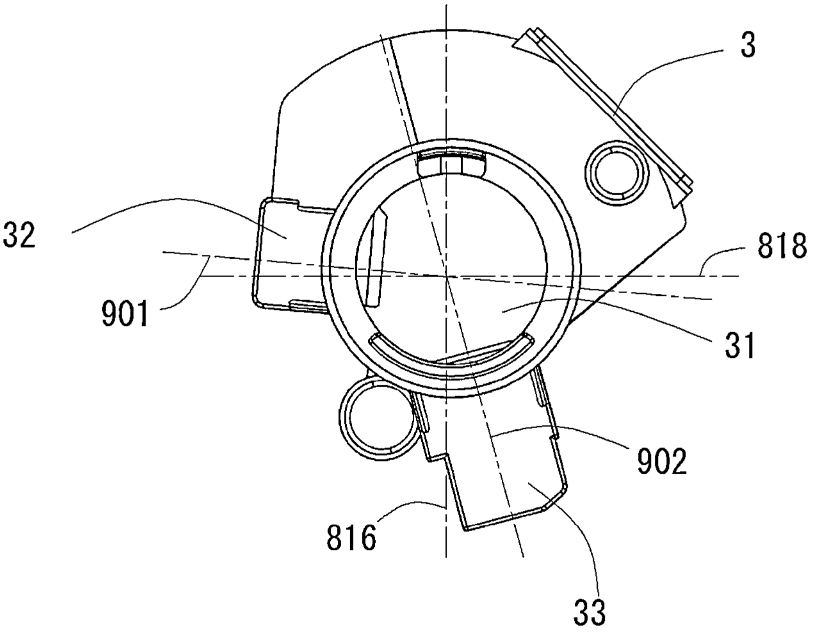
[Fig. 22]
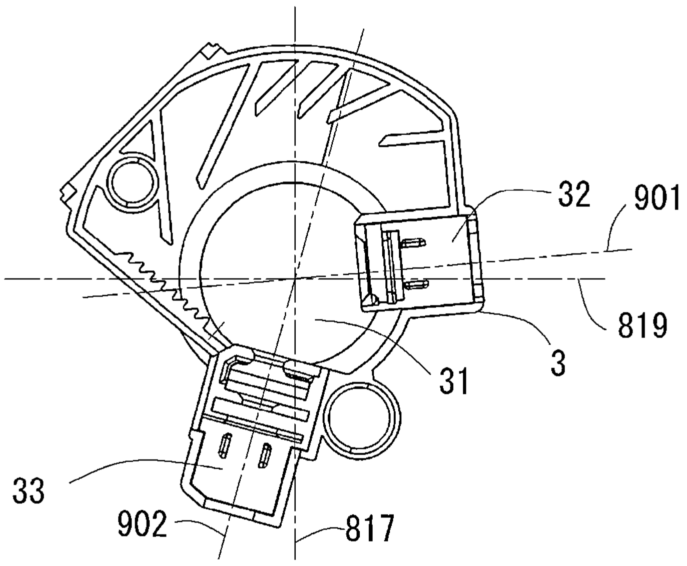

[Fig. 23]
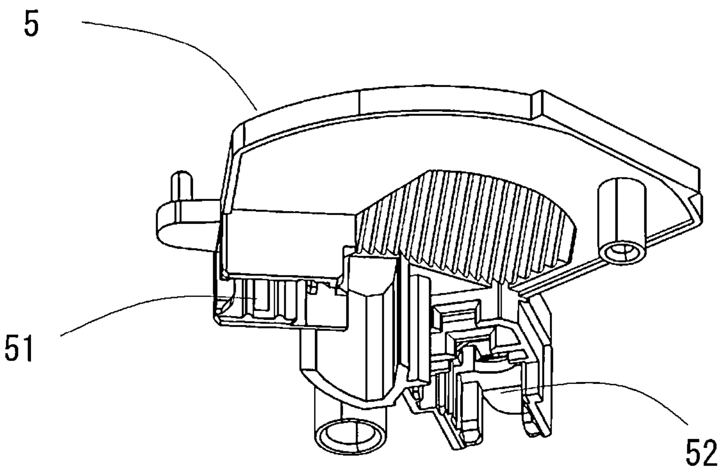
[Fig. 24]
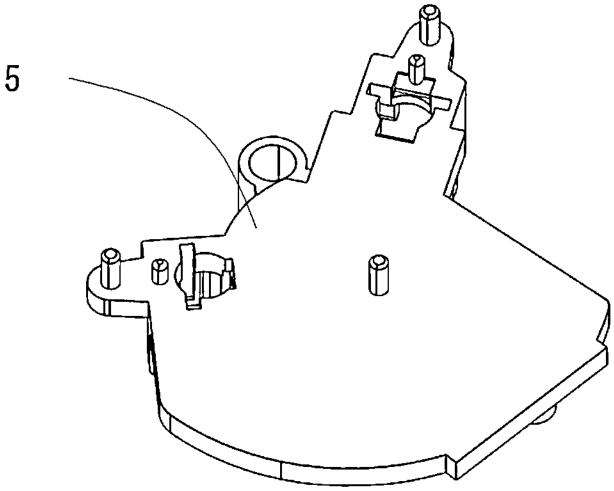

[Fig. 25]
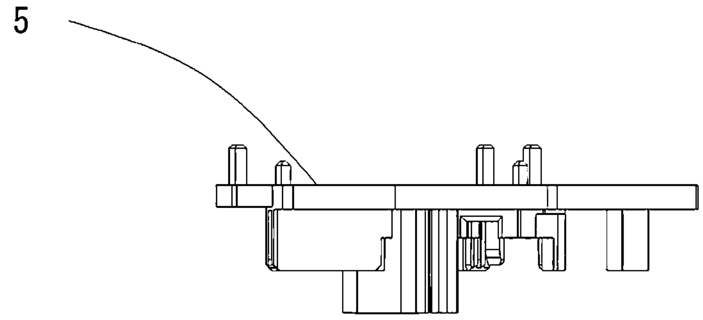
[Fig. 26]
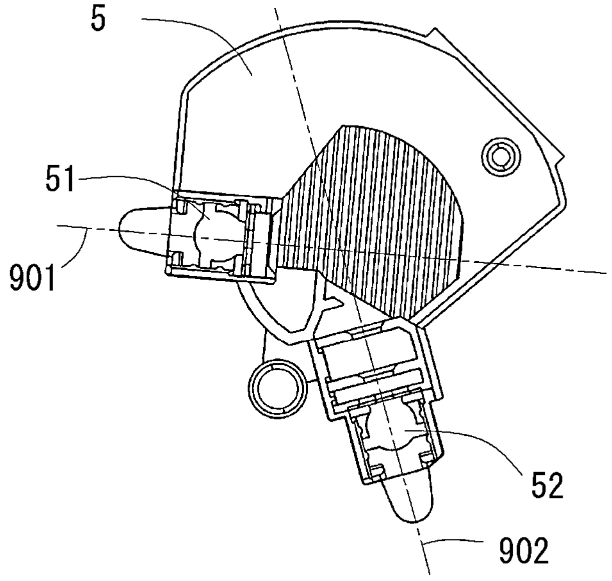

[Fig. 27]
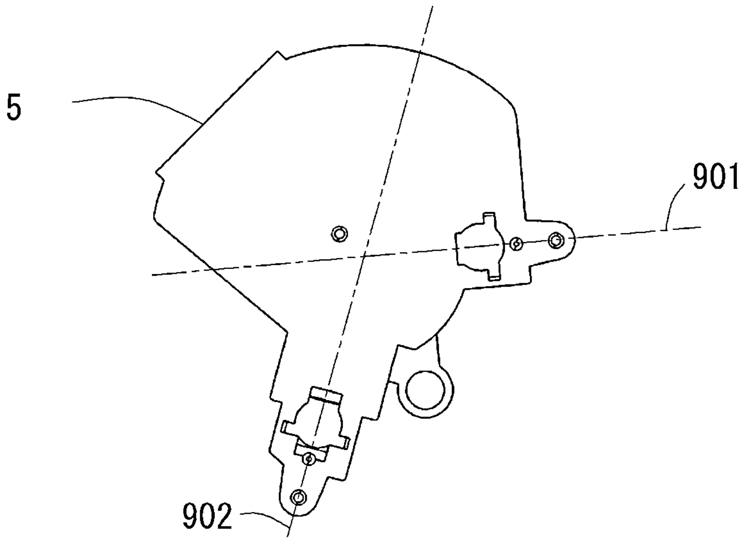
[Fig. 28]
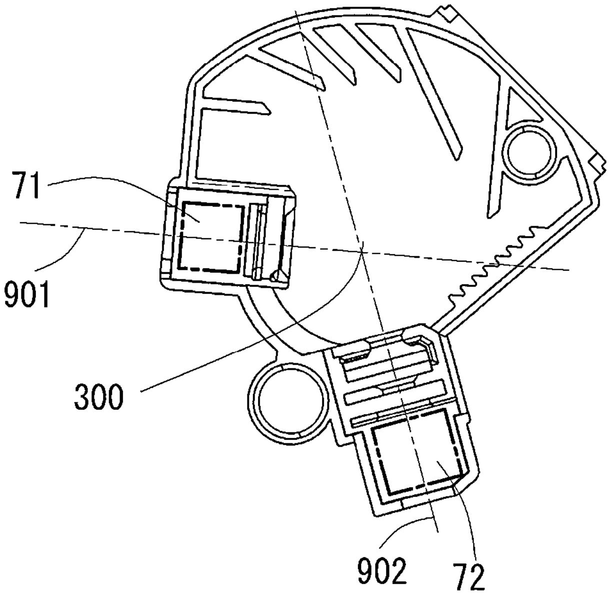

[Fig. 29]
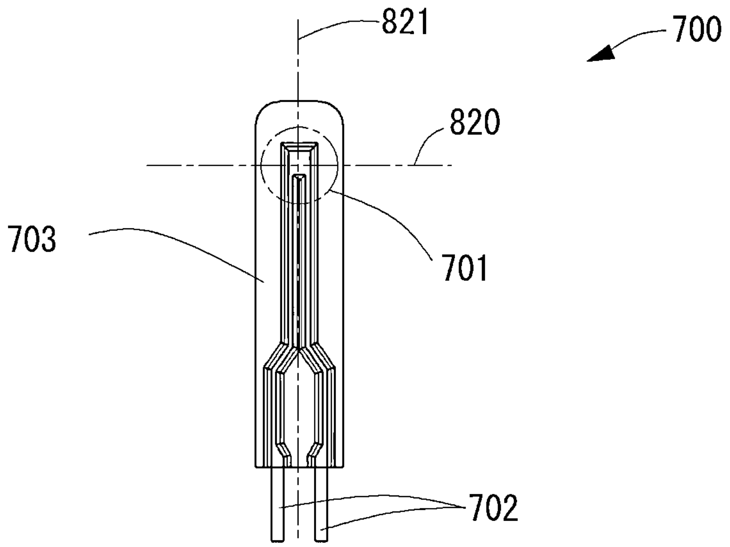
[Fig. 30]
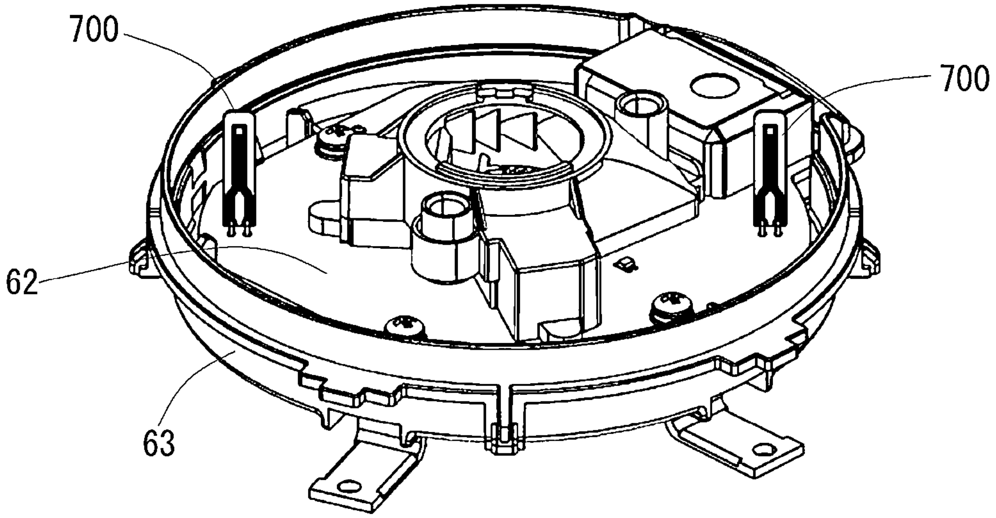

[Fig. 31]
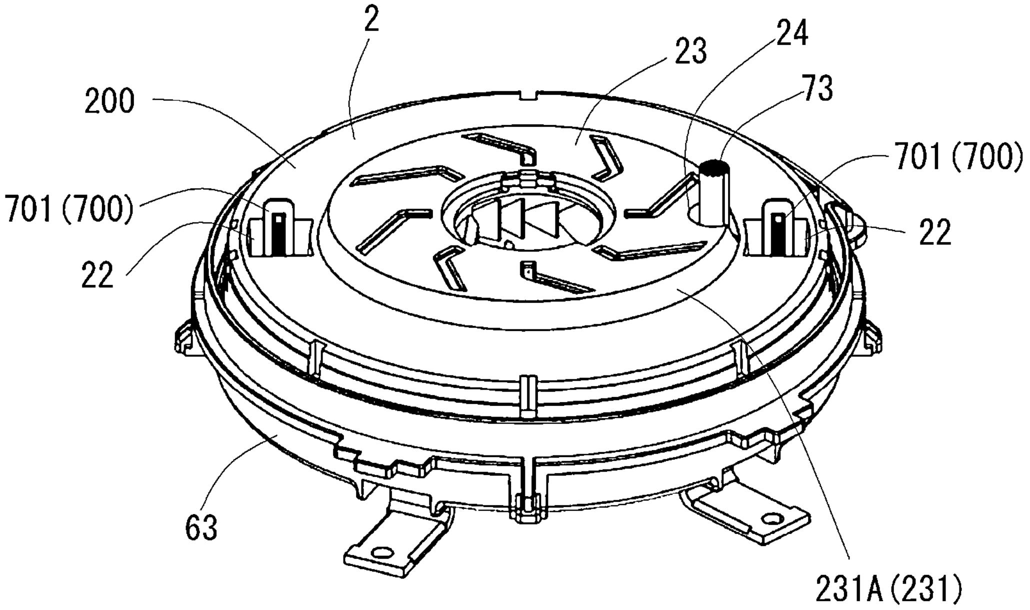
[Fig. 32]
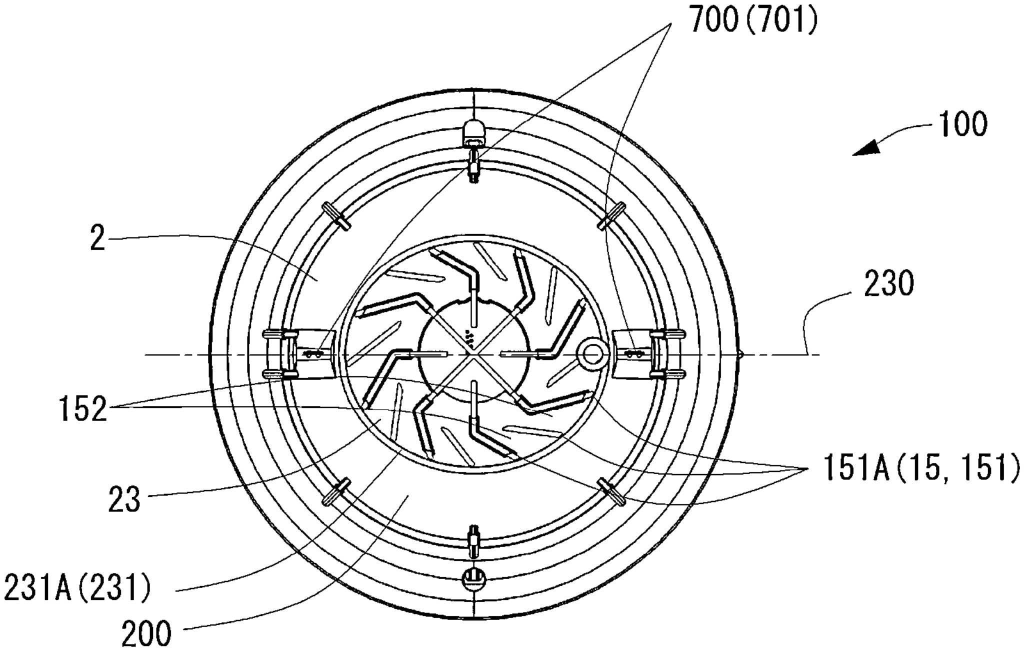

[Fig. 33]
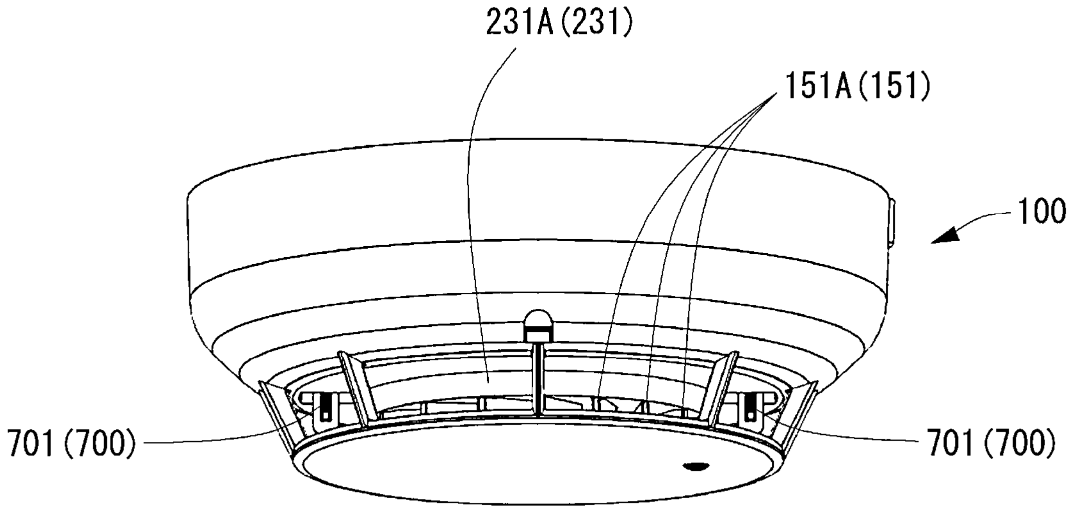
[Fig. 34]
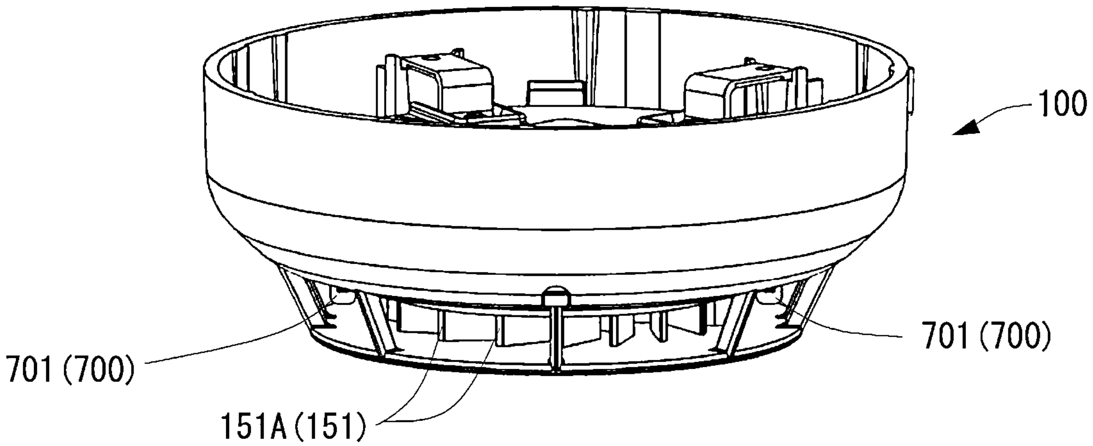

[Fig. 35]
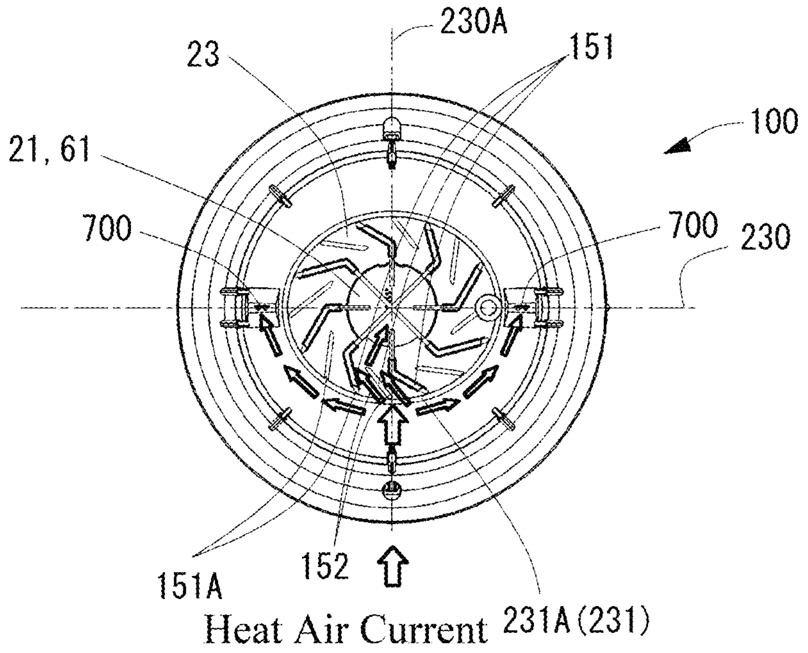
[Fig. 36]
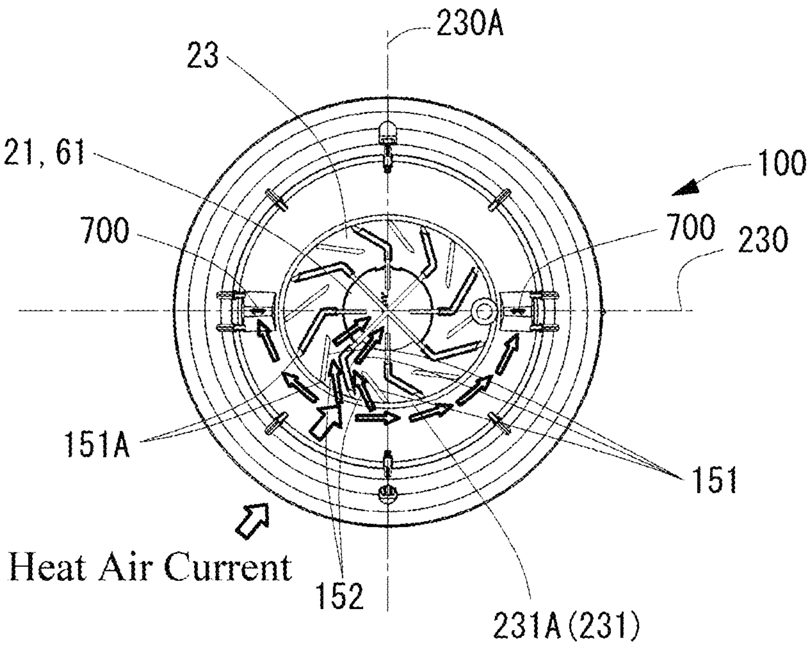

FIRE DETECTION APPARATUS

CROSS REFERENCE TO RELATED APPLICATIONS

The present application claims the benefit of the PCT application No. PCT/JP2022/000541 filed on Jan. 11, 2022, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, there has been known a fire detection apparatus that detects a fire based on heat of a heat air current caused by the fire (for example, Patent Document 1).

CITATION LIST

Patent Document

Patent Document 1: Laid-Open Patent Publication in Japan No. 2020-113030

SUMMARY OF THE INVENTION

Technical Problem

In a fire detection apparatus of Patent Document 1, a fire is detected based on heat detected by a heat detection element (for example, a thermistor, etc.) provided in the fire detection apparatus. Therefore, from a viewpoint of improving accuracy of fire detection, it is important to reliably guide a heat air current to the heat detection element, and a technique therefor has been desired.

It is an object of the present invention to solve the problems of the above mentioned prior arts.

Solution to Problem

One aspect of the present invention provides a fire detection apparatus comprises: a heat detection element configured to detect heat of a heat air current generated in association with a fire in a monitoring area, the heat detection element being disposed so that a detector protrudes from a predetermined base portion of the fire detection apparatus; and a control structure that has a stepped portion higher than the predetermined base portion, the control structure being configured to guide the heat air current to the detector of the heat detection element along an outer peripheral wall of the stepped portion, wherein at least a part of the detector of the heat detection element is located on a base portion side lower than the uppermost part of the stepped portion.

BRIEF DESCRIPTION OF THE DRAWINGS

FIG. 1 is a side view of a sensor according to an embodiment.

FIG. 2 is a perspective view of the sensor.

FIG. 3 is a front view of the sensor.

FIG. 4 is a cross-sectional view taken along line A-A of FIG. 3.

FIG. 5 is an exploded perspective view of the sensor.

FIG. 6 is an exploded perspective view of the sensor.

FIG. 7 is a perspective view of an outer cover.

FIG. 8 is a perspective view of the outer cover.

FIG. 9 is a side view of the outer cover.

FIG. 10 is a front view of the outer cover.

FIG. 11 is a rear view of the outer cover.

FIG. 12 is a perspective view of an inner cover.

FIG. 13 is a perspective view of the inner cover.

FIG. 14 is a side view of the inner cover.

FIG. 15 is a front view of the inner cover.

FIG. 16 is a rear view of the inner cover.

FIG. 17 is a perspective view of a smoke detector cover.

FIG. 18 is a perspective view of the smoke detector cover.

FIG. 19 is a perspective view of the smoke detector cover.

FIG. 20 is a side view of the smoke detector cover.

FIG. 21 is a front view of the smoke detector cover.

FIG. 22 is a rear view of the smoke detector cover.

FIG. 23 is a perspective view of a smoke detector base.

FIG. 24 is a perspective view of the smoke detector base.

FIG. 25 is a side view of the smoke detector base.

FIG. 26 is a front view of the smoke detector base.

FIG. 27 is a rear view of the smoke detector base.

FIG. 28 is a diagram illustrating an inside of a detection space.

FIG. 29 is an enlarged view of a detection element.

FIG. 30 is a perspective view of the sensor in a state in which the outer cover and the inner cover are removed.

FIG. 31 is a perspective view of the sensor in a state in which the outer cover is removed.

FIG. 32 is a cross-sectional view taken along line B-B of FIG. 1.

FIG. 33 is a perspective view of the sensor.

FIG. 34 is a perspective view of the sensor.

FIG. 35 is a cross-sectional view taken along line B-B of FIG. 1.

FIG. 36 is a cross-sectional view taken along line B-B of FIG. 1.

MODE FOR CARRYING OUT THE INVENTION

An embodiment of a fire detection apparatus according to the invention will be described in detail below with reference to the accompanying drawings. However, the invention is not limited by this embodiment.

[Basic Concept of Embodiment]

First, a basic concept of the fire detection apparatus according to this embodiment will be described. The fire detection apparatus is an apparatus for detecting a fire in a monitoring area. The "monitoring area" is an area to be monitored by the fire detection apparatus, specifically is a concept indicating an indoor or outdoor area, and is, for example, a concept indicating an arbitrary space such as a room, a staircase, or a corridor.

Further, in the following embodiment, the case where the "monitoring area" is a room will be described as an example.

[Specific Content of Each Embodiment]

Next, specific content of the embodiment will be described.

(Configuration)

First, a configuration of a sensor of the present embodiment will be described. FIG. 1 is a side view of the sensor according to the present embodiment, FIG. 2 is a perspective view of the sensor, FIG. 3 is a front view of the sensor, FIG. 4 is a cross-sectional view taken along line A-A of FIG. 3, and FIGS. 5 and 6 are exploded perspective views of the sensor. Note that in each figure, an element related to a feature of the application in a sensor 100 is illustrated and described by attaching a reference symbol thereto, and a similar configuration to that of a conventional sensor may be applied to an element other than the described element. In addition, in FIG. 4, hatching of a cross section is omitted for convenience of description (which is similarly applied to other cross sections).

Note that it is presumed that X-Y-Z axes of each figure are orthogonal to one another, a Z-axis indicates a vertical direction (that is, a longitudinal direction or a thickness direction in an installed state of the sensor 100), a −Z direction is referred to as a front side, and a +Z direction is referred to as a rear side. In addition, the X-axis and the Y-axis indicate a horizontal direction (that is, a transverse direction or a width direction in the installed state of the sensor 100). In addition, in an XY-plane of FIG. 3, a direction away from a center of the sensor 100 is referred to as an outer peripheral side, and a direction approaching the center is referred to as an inner side.

Note that a reference line 801 of FIG. 1 is a center line passing through the center of the sensor 100 and parallel to an upward/downward direction of the drawing, and is illustrated for convenience of description. Note that reference lines of other respective figures are illustrated for convenience of description. A reference line 802 of FIG. 1 is a center line passing through a center of a detector 701 (FIG. 29) in a detection element 700 and parallel to the upward/downward direction of the drawing. A reference line 803 is a center line passing through the center of the detector 701 (FIG. 29) in the detection element 700 and parallel to a left-right direction of the drawing.

A reference line 804 of FIG. 3 is a center line passing through the center of the sensor 100 and parallel to the upward/downward direction of the drawing, and a reference line 805 is a center line passing through the center of the sensor 100 and parallel to the left-right direction of the drawing.

A reference line 806 of FIG. 4 is a center line passing through a center of a light receiving portion 72 and parallel to the upward/downward direction of the drawing, and a reference line 807 is a center line passing through the center of the light receiving portion 72 and parallel to the left-right direction of the drawing. A reference line 808 of FIG. 4 is a line indicating the same height position as that of a base portion 200, and a reference line 809 is a line indicating the same height position as a frontmost position of a protrusion 23 (that is, the same height position as a frontmost position of a stepped portion 231).

Reference lines 810 and 811 of FIGS. 5 and 6 are center lines passing through the center of the sensor 100 and parallel to the upward/downward direction of the drawings.

The sensor 100 is a fire detection apparatus provided in the monitoring area, and is, for example, an apparatus for detecting a fire in the monitoring area. For example, the sensor 100 is installed on a ceiling 900, which is an installation target.

Note that the installation target of the sensor 100 is not limited to the ceiling 900. For example, a wall (not illustrated) of a room, etc. may be the installation target. However, in the present embodiment, the case where the installation target is the ceiling 900 (that is, the sensor 100 is installed on the ceiling 900) will be described as an example. Note that, in the present embodiment, it is presumed that a ceiling surface of the ceiling 900, which is the installation target, and an installation surface, among the ceiling surface, on which the sensor 100 is installed is a surface along the XY-plane, that is, a surface parallel to the XY-plane. In this instance, the reference line 801 of FIG. 1 is orthogonal to the XY-plane.

As illustrated in FIGS. 5 and 6, for example, the sensor 100 includes an outer cover 1, an inner cover 2, a smoke detector cover 3, a smoke detector base 5, an insect screen 61 (FIG. 6), a board 62, a terminal board 63, an engaging metal fitting 64, the detection element 700, a light emitting portion 71, a light receiving portion 72, and a light guide 73.

(Configuration—Outer Cover)

FIGS. 7 and 8 are perspective views of the outer cover, FIG. 9 is a side view of the outer cover, FIG. 10 is a front view of the outer cover, and FIG. 11 is a rear view of the outer cover. Note that, in each figure, with regard to a plurality of similar components (for example, a connecting portion 13, an opening 14, etc. of FIG. 9), for convenience of description, only some of the components will be described by attaching reference symbols thereto (which is similarly applied to other elements of other figures).

Note that reference lines 812 and 814 of FIGS. 10 and 11 are center lines passing through a center of the outer cover 1 and parallel to the upward/downward direction of the drawings, and reference lines 813 and 815 of FIGS. 10 and 11 are center lines passing through the center of the outer cover 1 and parallel to the left-right direction of the drawings.

The outer cover 1 covers and houses elements of the sensor 100 (the inner cover 2, the smoke detector cover 3, etc.) from the front side, and forms a part of an outer shape of the sensor 100. For example, the outer cover 1 is made of resin. For example, the outer cover 1 includes a main body 11, a top plate portion 12, a connecting portion 13, an opening 14, a labyrinth portion 15, and a light guide opening 16 of FIG. 9.

(Configuration—Outer Cover—Main Body)

The main body 11 is a substantially cylindrical portion having a predetermined diameter.

(Configuration—Outer Cover—Top Plate Portion)

The top plate portion 12 is a portion provided on the front side of the main body 11, and is a circular plate-shaped portion having a smaller diameter than that of an outer circumference of the main body.

(Configuration—Outer Cover—Connecting Portion)

The connecting portion 13 is a portion that connects the main body 11 and the top plate portion 12 to each other, and is, for example, a portion extending between the main body 11 and the top plate portion 12 as illustrated in FIG. 9.

(Configuration—Outer Cover—Opening)

The opening 14 is an opening for allowing a heat air current to flow into the sensor 100 or allowing the heat air current to flow out from the inside of the sensor 100. The opening 14 is formed in a gap between the main body 11 and the top plate portion 12, and is divided into a plurality of parts by a plurality of connecting portions 13.

Note that the "heat air current" is a concept indicating a flow of a fluid or the fluid itself including a detection target generated in association with a fire in the monitoring area, and is, for example, a concept indicating a flow of a relatively high-temperature fluid or the fluid itself. The "detection target" is a target detected by the sensor 100, specifically is a target generated in association with a fire in the monitoring area, and is, for example, a concept including smoke particles generated in association with a fire.

(Configuration—Outer Cover—Labyrinth Portion)

The labyrinth portion 15 is a control structure that guides the heat air current to the detection element 700. For example, the labyrinth portion 15 guides a fluid including the detection target to a detection space 300 (FIG. 4). Note that details of the labyrinth portion 15 will be described later.

Note that the "control structure" is an element for guiding the heat air current to the detection element 700, and has, for example, the labyrinth portion 15 and the stepped portion 231 (described later). Note that a position of this control structure is any position. For example, the position may be a position near the detection element 700 or a position away from the detection element 700.

The "detection space 300" is a space for detecting smoke (more specifically, smoke particles), which is a detection target caused by a fire, and is a lightproof space. Note that the detection space 300 may be construed as corresponding to the "smoke detector". A position or size of the detection space 300 is any position or any size. However, as illustrated in FIG. 4, for example, the detection space 300 may be disposed inside an outer peripheral wall 231A of the stepped portion 231 of the inner cover 2. Alternatively, as a variation, the detection space 300 may be disposed regardless of a position of the outer peripheral wall 231A. Note that the stepped portion 231 and the outer peripheral wall 231A of the inner cover 2 will be described later. Further, for example, the detection space 300 may be disposed on a rear side of the stepped portion 231 and the labyrinth portion 15. Note that the "rear side" herein may be construed as corresponding to a "lower part".

(Configuration—Outer Cover—Light Guide Opening)

The light guide opening 16 is a penetrating opening for exposing a tip of the light guide 73 (FIGS. 5 and 6) to the outside of the sensor 100.

(Configuration—Inner Cover)

FIGS. 12 and 13 are perspective views of the inner cover, FIG. 14 is a side view of the inner cover, FIG. 15 is a front view of the inner cover, and FIG. 16 is a rear view of the inner cover.

Note that a major axis 230 of FIGS. 15 and 16 indicates a major axis of an ellipse, which is a peripheral shape of the protrusion 23 (FIG. 15), and indicates a center line passing through a center of the inner cover 2 and parallel to the left-right direction of the drawings. A minor axis 230A of FIGS. 15 and 16 indicates a minor axis of the ellipse, which is the peripheral shape of the protrusion 23 (FIG. 15), and indicates a center line passing through the center of the inner cover 2 and parallel to the upward/downward direction of the drawings.

The inner cover 2 covers and houses an element (the smoke detector cover 3, etc.) of the sensor 100, and has a circular shape in a front view. For example, the inner cover 2 is made of resin. For example, the inner cover 2 has a first opening 21, a second opening 22, the protrusion 23, and a light guide opening 24 of FIG. 12.

(Configuration—Inner Cover—First Opening)

The first opening 21 is an opening for allowing the heat air current to flow into the detection space 300 and allowing the heat air current to flow out from the inside of the detection space 300. As illustrated in FIG. 15, for example, the first opening 21 is a circular opening provided at the center of the inner cover 2 in a front view. The first opening 21 is an opening penetrating the stepped portion 231 from the front side to the rear side. For example, penetrating the stepped portion 231 from the front side to the rear side may be construed as a concept indicating penetrating the protrusion 23 having the stepped portion 231 from a surface on the front side to the rear side. In addition, the surface on the front side of the stepped portion 231 (that is, the surface on the front side of the protrusion 23) may be construed as corresponding to an "upper surface", and the rear side of the stepped portion 231 (that is, the rear side of the protrusion 23) may be construed as corresponding to a "lower surface side".

(Configuration—Inner Cover—Second Opening)

The second opening 22 is an opening which the detection element 700 is inserted through and is disposed in. As illustrated in FIG. 15, for example, the second opening 22 is a rectangular opening having an elliptical shape in a front view and provided on each of both sides of the protrusion 23 on the major axis 230 of the protrusion 23 (the major axis of the ellipse which is a peripheral shape of the outer peripheral wall 231A in the front view).

(Configuration—Inner Cover—Protrusion)

The protrusion 23 is a portion of the inner cover 2 protruding from the base portion 200 (FIGS. 12, 14, and 15) toward the front side. The "base portion" 200 is a predetermined base portion of the sensor 100, and is, for example, a surface provided on the outer peripheral side of the protrusion 23 of the inner cover 2. A configuration of the base portion 200 is any configuration. However, as illustrated in FIG. 1, for example, in a side view, the base portion 200 may be provided at a position slightly on the front side (−Z direction) of an edge of the opening 14 of the outer cover 1 on the rear side (+Z direction). Note that details of the protrusion 23 will be described later.

(Configuration—Inner Cover—Light Guide Opening)

The light guide opening 24 is an opening which the light guide 73 (FIGS. 5 and 6) is inserted through and is disposed in.

(Configuration—Smoke Detector Cover)

FIGS. 17 and 19 are perspective views of the smoke detector cover, FIG. 20 is a side view of the smoke detector cover, FIG. 21 is a front view of the smoke detector cover, and FIG. 22 is a rear view of the smoke detector cover.

The smoke detector cover 3 covers the detection space 300 (FIG. 4), a light emitting-side optical element 712 (FIGS. 5 and 6), and the light receiving-side optical element 722 together with the smoke detector base 5, that is, partitions the inside and outside of the detection space 300. For example, the smoke detector cover 3 is made of resin. As illustrated in FIGS. 17 to 19, for example, the smoke detector cover 3 includes an opening 31, a light emitting-side housing 32, and a light receiving-side housing 33.

(Configuration—Smoke Detector Cover—Opening)

The opening 31 is an opening for allowing the heat air current to flow into the detection space 300 and allowing the heat air current to flow out from the inside of the detection space 300. As illustrated in FIG. 21, for example, the opening 31 is a circular opening and has substantially the same diameter as that of the first opening 21 of the inner cover 2.

(Configuration—Smoke Detector Cover—Each Housing)

The light emitting-side housing 32 is a portion that houses the light emitting-side optical element 712 (FIGS. 5 and 6).

The light receiving-side housing 33 is a portion that houses the light receiving-side optical element 722 (FIGS. 5 and 6).

(Configuration—Smoke Detector Base)

FIGS. 23 and 24 are perspective views of the smoke detector base, FIG. 25 is a side view of the smoke detector base, FIG. 26 is a front view of the smoke detector base, and FIG. 27 is a rear view of the smoke detector base.

Note that a reference line 816 of FIG. 21 is a center line passing through a center of the smoke detector cover 3 and parallel to the upward/downward direction of the drawing, and a reference line 818 is a center line orthogonal thereto. An optical axis 901 indicates an optical axis of the light emitting portion 71 (FIG. 28) in the sensor 100 in an assembled state. An optical axis 902 indicates an optical axis of the light receiving portion 72 (FIG. 28) in the sensor 100 in the assembled state. A reference line 817 of FIG. 22 is a center line passing through the center of the smoke detector cover 3 and parallel to the upward/downward direction of the drawing, and a reference line 819 is a center line orthogonal thereto.

The smoke detector base 5 covers the detection space 300 (FIG. 4), the light emitting-side optical element 712 (FIGS. 5 and 6), and the light receiving-side optical element 722 together with the smoke detector cover 3, that is, partitions the inside and outside of the detection space 300. For example, the smoke detector base 5 is made of resin. For example, the smoke detector base 5 has a flat plate shape as a whole, and includes a light emitting-side housing 51 (FIGS. 23 and 26) and a light receiving-side housing 52.

(Configuration—Smoke Detector Base—Each Housing)

The light emitting-side housing 51 is a portion for housing the light emitting-side optical element 712 (FIGS. 5 and 6), and is a portion provided at a position corresponding to the light emitting-side housing 32 of the smoke detector cover 3 in the sensor 100 in the assembled state.

The light receiving-side housing 52 is a portion for housing the light receiving-side optical element 722 (FIGS. 5 and 6), and is a portion provided at a position corresponding to the light receiving-side housing 33 of the smoke detector cover 3 in the sensor 100 in the assembled state.

(Configuration—Insect Screen)

The insect screen 61 of FIG. 6 is used to prevent insects from entering the detection space 300 while allowing the heat air current to flow into or out of the detection space 300 (FIG. 4). For example, the insect screen 61 is a circular one provided in the first opening 21 of the inner cover 2, and is provided with a plurality of small holes (not illustrated) having such a predetermined diameter that the small holes allow inflow or outflow of the heat air current and can prevent entry of insects.

(Configuration—Board)

The board 62 of FIGS. 5 and 6 is a circuit board on which an electric circuit including various elements, an IC, electric wiring, etc. is mounted. As illustrated in FIG. 6, for example, a light emitting element 711 and a light receiving element 721 are mounted on a surface of the board 62 on the front side. Further, the detection element 700 is mounted on the board 62 in addition to each of these elements.

(Configuration—Terminal Board)

The terminal board 63 of FIGS. 5 and 6 covers elements (the smoke detector cover 3, etc.) of the sensor 100 from the rear side. The terminal board 63 is attached to the ceiling 900 via the engaging metal fitting 64, that is, is an attachment portion for attaching the sensor 100 to the ceiling 900.

(Configuration—Engaging Metal Fitting)

The engaging metal fitting 64 is detachably attached to the terminal board 63 and an attachment structure on the ceiling 900 side (for example, a structure fit to or engaged with the engaging metal fitting 64 to fix and attach the engaging metal fitting 64). By using the engaging metal fitting 64, the sensor 100 including the terminal board 63 can be attached to the ceiling 900. Note that the engaging metal fitting 64 may be construed as corresponding to the "attachment portion".

In addition, although not illustrated in the present embodiment, it is presumed that the sensor 100 is attached to the ceiling 900 using an attachment base that is a circular plate-shaped member having approximately the same diameter as that of the terminal board 63. When this attachment base is used, the attachment base may be construed as corresponding to the "attachment portion". Note that the "attachment base" is a member provided between the sensor 100 and the ceiling 900 and used to install and attach the sensor 100 to the ceiling 900. Since a known configuration can be applied, a detailed description is omitted.

(Configuration—Detection Element)

The detection element 700 of FIGS. 5 and 6 is a heat detection element that detects heat of the heat air current generated in association with the fire in the monitoring area. Note that details of the detection element 700 will be described later.

(Configuration—Light Emitting Portion)

FIG. 28 is a diagram illustrating the inside of the detection space. Note that FIG. 28 illustrates a state in which the inside of the smoke detector cover 3 is viewed from the front side in the sensor 100 in the assembled state, and illustration of a detailed structure of the smoke detector base 5 is omitted for convenience of description.

The light emitting portion 71 of FIG. 28 is a light emitting section that emits emission light for detecting smoke particles, which are detection targets, into the detection space 300. As illustrated in FIGS. 5 and 6, for example, the light emitting portion 71 includes the light emitting element 711 and the light emitting-side optical element 712.

(Configuration—Light Emitting Portion—Light Emitting Element)

The light emitting element 711 is an element that emits light (emission light), and may be configured using, for example, a light emitting diode (LED). The light emitting element 711 is mounted on the board 62.

(Configuration—Light Emitting Portion—Light Emitting-Side Optical Element)

The light emitting-side optical element 712 is an element that guides and emits emission light emitted by the light emitting element 711 into the detection space 300, and may be configured using, for example, a prism. For example, the light emitting-side optical element 712 is housed in the smoke detector cover 3 and the smoke detector base 5.

For example, the light emitting-side optical element 712 is configured to emit light from the light emitting element 711 mainly in a direction parallel to the smoke detector base 5 (that is, a direction parallel to the XY-plane of FIG. 3).

(Configuration—Light Receiving Portion)

The light receiving portion 72 of FIG. 28 is a light receiving section that receives scattered light, etc. generated by emission light scattered by the smoke particles, which are detection targets in the detection space 300. As illustrated in FIGS. 5 and 6, for example, the light receiving portion 72 includes the light receiving element 721 and the light receiving-side optical element 722.

(Configuration—Light Receiving Portion—Light Receiving Element)

The light receiving element 721 is an element that receives light (scattered light, etc.), and may be configured using, for example, a photodiode. The light receiving element 721 is mounted on the board 62.

(Configuration—Light Receiving Portion—Light Receiving-Side Optical Element)

The light receiving-side optical element 722 is an element that guides light in the detection space 300 to the light receiving element 721, and may be configured using, for example, a prism. The light receiving-side optical element 722 is housed in the smoke detector cover 3 and the smoke detector base 5.

The light receiving-side optical element 722 is configured to guide scattered light, etc. scattered by the smoke particles and entering the light receiving-side optical element 722 to the light receiving element 721.

(Configuration—Light Guide)

The light guide 73 of FIGS. 5 and 6 is an element that functions as an indicator light of the sensor 100, and as illustrated in FIGS. 2 and 3, for example, a part thereof is exposed on the front side of the sensor 100. For example, on the assumption that a light emitting element (LED) different from the light emitting-side optical element 712 is provided on the surface of the board 62 on the front side, the light guide 73 is an element that guides light from this light emitting element and outputs the light to the front side of the sensor 100. The "indicator light" is an element that displays a state of the sensor 100. For example, the indicator light outputs light of a color (for example, green or red) according to the state of the sensor 100 to display the state of the sensor 100.

(Configuration—Details of Detection Element)

Next, details of the detection element 700 will be described. FIG. 29 is an enlarged view of the detection element, FIG. 30 is a perspective view of the sensor in a state in which the outer cover and the inner cover are removed, FIG. 31 is a perspective view of the sensor in a state in which the outer cover is removed, FIG. 32 is a cross-sectional view taken along line B-B of FIG. 1, and FIGS. 33 and 34 are perspective views of the sensor.

Note that a reference line 820 of FIG. 29 is a center line passing through a center of the detector 701 of the detection element 700 and parallel to the left-right direction of the drawing, and a reference line 821 is a center line passing through the center of the detector 701 of the detection element 700 and parallel to the upward/downward direction of the drawing.

As described above, the detection element 700 is a heat detection element that detects heat of the heat air current generated in association with the fire in the monitoring area. For example, the detection element 700 may be configured using a thermistor, etc. that detects a temperature corresponding to heat and outputs temperature information indicating the detected temperature. As illustrated in FIG. 29, for example, the detection element 700 includes the detector 701 and a terminal portion 702. For example, the detector 701 is interposed by a film-like insulating member 703 on both front and rear surfaces.

The detector 701 is a portion for detecting heat in the detection element 700, and is, for example, a portion whose resistance value changes due to temperature fluctuation. The terminal portion 702 is a terminal for electrically connecting the detection element 700 to an electric circuit of the sensor 100.

The detection element 700 is mounted on the board 62 as illustrated in FIG. 30 by electrically connecting and fixing the terminal portion 702 to the wiring of the board 62 using solder, etc. in a state in which the terminal portion 702 is inserted into a connection hole of the board 62. In addition, since the detection element 700 is inserted through the second opening 22 (FIG. 15) of the inner cover 2, as illustrated in FIG. 32, for example, the detection element 700 (that is, the detector 701 of the detection element 700) has an elliptical shape in a front view and is disposed on the major axis 230 of the protrusion 23 and on the outside of the outer peripheral wall 231A of the stepped portion 231. That is, two detection elements 700 (that is, two detectors 701 of the detection elements 700) are disposed on the outside of the outer peripheral wall 231A of the stepped portion 231 to face each other with the protrusion 23 having the stepped portion 231 and the labyrinth portion 15 interposed therebetween.

As illustrated in FIGS. 1 and 31, for example, the detection element 700 is disposed to protrude from the base portion 200 of the inner cover 2 through the second opening 22 (FIG. 31). At least a part of the detector 701 of the detection element 700 is located on the base portion 200 side lower than the uppermost step of the stepped portion 231 (FIGS. 1 and 31) of the inner cover 2.

Note that, for example, the uppermost step of the stepped portion 231 is a concept indicating a portion on the frontmost side of the stepped portion 231 (corresponding to a lowermost portion of the drawing in FIG. 1 and corresponding to an uppermost portion of the drawing in FIG. 31). In addition, the base portion 200 side lower than the uppermost step of the stepped portion 231 is a concept indicating a side closer to the base portion 200 in the longitudinal direction (X-axis direction of FIG. 1). That is, at least the part of the detector 701 of the detection element 700 is provided between a height position corresponding to the uppermost step of the stepped portion 231 of the inner cover 2 and a height position corresponding to the base portion 200 in the longitudinal direction.

In the present embodiment, as illustrated in FIG. 1, for example, a part of the detector 701 of the detection element 700 is provided between the height position corresponding to the uppermost step of the stepped portion 231 of the inner cover 2 and the height position corresponding to the base portion 200, and another part of the detector 701 of the detection element 700 (that is, a portion on the front side of the part of the detector 701 of the detection element 700 (that is, a portion on the lower side of the drawing of FIG. 1)) is provided at a position away from the base portion 200 in a height direction with respect to the height position corresponding to the uppermost step of the stepped portion 231 of the inner cover 2. Note that arrangement of the detection element 700 is not limited thereto. For example, the entire detector 701 of the detection element 700 may be provided between the height position corresponding to the uppermost step of the stepped portion 231 of the inner cover 2 and the height position corresponding to the base portion 200 in the longitudinal direction.

(Configuration—Details of Protrusion)

Next, details of the protrusion 23 illustrated in FIGS. 12, 14 and 15 will be described. The protrusion 23 is a portion that protrudes from the base portion 200 of the inner cover 2 toward the front side, and includes, for example, the stepped portion 231.

The stepped portion 231 is the aforementioned control structure, and as illustrated in FIG. 14, for example, is a stepped portion corresponding to a peripheral edge of the protrusion 23 (that is, a shoulder portion of the protrusion 23). The stepped portion 231 is a portion that guides the heat air current to the detector 701 of the detection element 700 along the outer peripheral wall 231A (FIG. 32).

As illustrated in FIG. 14, for example, the outer peripheral wall 231A of the stepped portion 231 is a portion corresponding to an inclined portion of the stepped portion 231. For example, the outer peripheral wall 231A is inclined toward the center side of the inner cover 2 as being away from the base portion 200 in the upward/downward direction of the drawing of FIG. 14. As illustrated in FIG. 32, for example, the outer peripheral wall 231A has an elliptical peripheral shape in a front view. That is, the protrusion 23 has an elliptical shape in a front view.

(Configuration—Details of Protrusion)

Next, details of the labyrinth portion 15 of FIGS. 8, 9, and 11 will be described. The labyrinth portion 15 is the aforementioned control structure and introduces a fluid containing the detection target into the detection space 300. The labyrinth portion 15 includes, for example, a plurality of partition walls 151 as illustrated in FIG. 11.

The partition walls 151 are provided by being fixed to a surface of the top plate portion 12 on the rear side, protrude from the top plate portion 12 toward the rear side by a predetermined height, and are provided adjacent to each other with a gap 152 therebetween. The partition walls 151 may be formed integrally with the top plate portion 12 or may be formed separately from the top plate portion 12 and then fixed thereto using an adhesive, etc. In the present embodiment, it is assumed that the partition walls 151 are integrally formed.

In the sensor 100 of FIG. 1 in the assembled state, as illustrated in FIG. 32, for example, the partition walls 151 are erected from an upper surface (surface on the front side) of the protrusion 23 having the stepped portion 231 of the inner cover 2. For example, the partition walls 151 extend from the inside to the outside of the sensor 100. A side end portion 151A of each of the partition walls 151 is disposed along an outer periphery of the stepped portion 231 on the front side of the stepped portion 231. Therefore, the side end portion 151A of the partition wall 151 is disposed on an ellipse in a front view. Note that the side end portion 151A of the partition wall 151 is a portion corresponding to a part of the partition wall 151, and specifically is a portion corresponding to the outer peripheral side of the stepped portion 231 on the partition wall 151.

Since such a configuration is adopted, the labyrinth portion 15 may be construed as an element of the stepped portion 231 in which the plurality of partition walls 151 is disposed with the gap 152 therebetween and erected from an upper surface of the stepped portion 231 along the outer periphery of the stepped portion 231.

(Assembly Procedure for Sensor)

Next, a procedure for assembling the sensor 100 will be described. Here, an example of the procedure for assembling the sensor 100 will be described mainly with reference to FIGS. 5 and 6.

First, the light emitting-side optical element 712 and the light receiving-side optical element 722 are housed in the light emitting-side housing 51 (FIGS. 23 and 26) and the light receiving-side housing 52 of the smoke detector base 5.

Next, the smoke detector cover 3 is attached to the smoke detector base 5 using any method (for example, a method using an engagement structure provided in each element, etc.). In this case, the light emitting-side optical element 712 and the light receiving-side optical element 722 are also housed in the light emitting-side housing 32 (FIG. 19) and the light receiving-side housing 33 of the smoke detector cover 3.

Next, the board 62 on which the light emitting element 711, the light receiving element 721, and the detection element 700 are mounted is attached to the terminal board 63 from the front side of the terminal board 63 (the upper side of the drawing of FIG. 6) using any method (for example, a screwing method, etc.). In addition, the engaging metal fitting 64 is attached to the terminal board 63 from the rear side of the terminal board 63 (the lower side of the drawing of FIG. 6) using any method (for example, a screwing method, etc.).

Next, as illustrated in FIG. 30, the smoke detector base 5 with the smoke detector cover 3 attached thereto is attached to the board 62 from the front side of the board 62 (the upper side of the drawing of FIG. 6) using any method (for example, a method of using an engagement structure provided in each element, a screwing method, etc.).

Next, as illustrated in FIG. 31, the inner cover 2 is attached to the terminal board 63 from the front side of the terminal board 63 (the upper side of the drawing of FIG. 6) to which the smoke detector cover 3, etc. is attached using any method (for example, a method of using an engagement structure provided in each element, etc.). Note that, in this case, a part of the detection element 700 is inserted through the second opening 22 of the inner cover 2 and protrudes from the inner cover 2 toward the front side. In addition, the light guide 73 is inserted through the light guide opening 24 of the inner cover 2.

Next, the insect screen 61 is provided in the first opening 21 of the inner cover 2.

Next, the outer cover 1 is attached to the terminal board 63 from the front side (the upper side of the drawing of FIG. 6) of the terminal board 63 to which the inner cover 2, etc. is attached using any method (for example, a method using an engagement structure provided in each element, etc.). Note that, in this case, as illustrated in FIG. 1, the labyrinth portion 15 of the outer cover 1 comes into contact with the protrusion 23 of the inner cover 2. In addition, the insect screen 61 is pressed by some of the partition walls 151 of the labyrinth portion 15 (in FIG. 11, a crisscross intersection at the center of the outer cover 1), and the insect screen 61 is fixed to the sensor 100. In addition, the tip of the light guide 73 is exposed to the outside of the sensor 100 through the light guide opening 16 (FIG. 7) of the outer cover 1. In this way, assembly of the sensor 100 illustrated in FIGS. 1 to 4, 33, and 34 is completed.

(Fire Detection Operation)

Next, a fire detection operation by the sensor 100 will be described. For example, the sensor 100 performs an operation of detecting a fire based on the amount of light received by the light receiving portion 72 or the temperature of the heat air current detected by the detection element 700. Since a known operation may be applied as this operation, only an outline will be described. In addition, since two detection elements 700 are provided in the sensor 100, a detection result of one of the two detection elements 700 detecting a higher temperature is used.

(Fire Detection Operation—when No Fire is Detected)

For example, when there is no fire in the monitoring area, no heat air current containing smoke particles flows into the detection space 300 of FIG. 28. Thus, there is no scattered light based on emission light emitted from the light emitting portion 71, and the light receiving portion 72 does not receive scattered light. In this case, the sensor 100 does not detect a fire.

In addition, since the heat air current containing smoke particles is not supplied to the detection element 700, the temperature detected by the detection element 700 is at a room temperature level. In this case, the sensor 100 does not detect a fire.

(Fire Detection Operation—when Fire is Detected)

On the other hand, for example, when a fire occurs in the monitoring area, a heat air current containing smoke particles flows into the detection space 300 of FIG. 28. Therefore, the smoke particles are irradiated with light emitted from the light emitting portion 71 to generate a relatively large amount of scattered light, and the light receiving portion 72 receives the scattered light. In this case, the sensor 100 detects a fire. Note that details of supply of a heat air current resulting from occurrence of fire to the sensor 100 will be described later.

In addition, for example, a heat air current containing smoke particles is supplied to the detection elements 700, causing a temperature detected by at least one of the two detection elements 700 to rise to a predetermined level. In this case, the sensor 100 detects a fire.

Note that the fire detection operation described herein is an example and is not limited. More specifically, the following operation may be performed.

For example, a fire may be detected when the light receiving portion 72 receives a relatively large amount of light and the temperature detected by the detection element 700 rises to a predetermined level. Alternatively, a fire may be detected when the temperature detected by the detection element 700 rises to a predetermined level, regardless of a light reception result of the light receiving portion 72.

(Supply of Heat Air Current)

Next, a description will be given of supply of a heat air current containing smoke particles, which is generated when a fire occurs in the monitoring area, to the sensor 100. FIGS. 35 and 36 are cross-sectional views taken along line B-B of FIG. 1. Note that in FIGS. 35 and 36, flows of heat air currents are indicated by white arrows. FIG. 35 illustrates the case where the heat air current is supplied toward the inside of the sensor 100 from a direction corresponding to the minor axis 230A of the protrusion 23 (minor axis of an ellipse which is a circumferential shape of the outer peripheral wall 231A in a front view). FIG. 36 illustrates the case where the heat air current is supplied toward the inside of the sensor 100 from a direction shifted from the minor axis 230A of the protrusion 23 by a predetermined angle.

First, in FIG. 1, the heat air current generated in the monitoring area due to occurrence of the fire is supplied to the sensor 100 along the ceiling 900 and flows into the outer cover 1 through the opening 14 of the outer cover 1.

Next, a part of the introduced heat air current is guided along the outer peripheral wall 231A (FIG. 32) of the stepped portion 231 and supplied to the detection element 700. Note that, in this case, the heat air current is guided by the side end portion 151A of each of the plurality of partition walls 151 in the labyrinth portion 15 disposed on the front side of the stepped portion 231 and supplied to the detection element 700.

Meanwhile, another part of the introduced heat air current climbs over the stepped portion 231 and is guided and supplied to the inside from the outer peripheral side of the sensor 100 through the gap 152 (FIG. 32) between the plurality of partition walls 151 of the labyrinth portion 15. Thereafter, the heat air current flows into the detection space 300 through the first opening 21 of the inner cover 2 and the opening 31 of the smoke detector cover 3. In particular, since the first opening 21 of the inner cover 2 is provided with the insect screen 61 (FIG. 6), the heat air current flows into the detection space 300 through a plurality of small holes (not illustrated) of the insect screen 61.

Here, as illustrated in FIG. 35, for example, when a heat air current is supplied toward the inside of the sensor 100 from the direction corresponding to the minor axis 230A, the heat air current is guided and supplied as indicated by a white arrow of FIG. 35. In addition, as illustrated in FIG. 36, for example, when a heat air current is supplied toward the inside of the sensor 100 from the direction shifted from the minor axis 230A by the predetermined angle, the heat air current is guided and supplied as indicated by a white arrow of FIG. 36.

(Temperature of Heat Air Current)

A description will be given of the case where heat air currents having the same temperature are supplied to the sensor 100 at the same flow rate. As illustrated in FIG. 35, when a heat air current is supplied toward the inside of the sensor 100 from the direction corresponding to the minor axis 230A, heat air currents having substantially the same temperature are supplied to two detection elements 700 of FIG. 35.

On the other hand, as illustrated in FIG. 36, when a heat air current is supplied toward the inside of the sensor 100 from the direction shifted from the minor axis 230A by the predetermined angle, a temperature of a heat air current supplied to a detection element 700 on the left side of the drawing of FIG. 36 is higher than a temperature of a heat air current supplied to a detection element 700 on the right side of the drawing of FIG. 36. However, the temperature of the heat air current supplied to the detection element 700 on the left side of the drawing of FIG. 36 is substantially the same as the temperature of the heat air current in the case of FIG. 35 (that is, the temperatures of the heat air currents supplied to the two detection elements 700 when the heat air currents are supplied to the inside of the sensor 100 from the direction corresponding to the minor axis 230A).

In addition, although not illustrated, when heat air currents are supplied toward the inside of the sensor 100 from all directions shifted from the minor axis 230A, a heat air current having substantially the same temperature as the temperature of the heat air current in the case of FIG. 35 (that is, the temperatures of the heat air currents supplied to the two detection elements 700 when the heat air current is supplied toward the inside of the sensor 100 from the direction corresponding to the minor axis 230A) is supplied to one of the two detection elements 700 to which a heat air current having a higher temperature is supplied.

These are caused by a temperature distribution of a heat air current determined by a configuration of the detection element 700 (in particular, arrangement position) and a configuration of the labyrinth portion 15 and the stepped portion 231 (in particular, a configuration related to an elliptical shape) functioning as a control structure. However, as a result of a predetermined experiment or simulation for confirming the temperature distribution of the heat air current, by adopting the configuration described in the embodiment, as described above, a heat air current having substantially the same temperature is supplied to at least one detection element 700 (for example, a detection element 700 detecting a higher temperature) regardless of a direction in which the heat air current is supplied to the sensor 100. That is, it is possible to suppress variation in the temperature of the heat air current detected by the detection element 700 based on the direction in which the heat air current is supplied.

Note that sizes of the labyrinth portion 15 and the stepped portion 231, a size and arrangement position of the detection element 700, etc. may be set in consideration of an acceptable range for normal operation of the sensor 100 with regard to the magnitude of the aforementioned variation (that is, variation of the temperature of the heat air current detected by the detection element 700 based on a direction of supply).

(Effect of Embodiment)

As described above, according to the embodiment, since the control structure is provided which includes the stepped portion 231 higher than the base portion 200 and guides the heat air current to the detector 701 of the detection element 700 along the outer peripheral wall 231A of the stepped portion 231, for example, the heat air current can be reliably guided to the detection element 700.

In addition, the labyrinth portion 15 is provided, and the labyrinth portion 15 introduces the heat air current to the detection space 300 provided inside the sensor 100 through the gap 152, supplies smoke particles (that is, particles of smoke) contained in the introduced heat air current to the detection space 300, and guides the heat air current to the detector 701 of the detection element 700 along the side end portion 151A corresponding to the outer peripheral wall 231A of the stepped portion 231 of the plurality of partition walls 151. In this way, for example, it is possible to reliably guide the heat air current to the detection element 700 and reliably supply smoke particles to the detection space 300 of the sensor 100, thereby improving fire detection accuracy.

Further, the heat air current containing smoke introduced into the labyrinth portion 15 is introduced to the detection space 300 disposed in the lower part of the control structure through the first opening 21 penetrating the stepped portion 231 of the control structure from the upper surface to the lower surface side. In this way, for example, it is possible to reliably supply smoke particles to the detection space 300 of the sensor 100.

In addition, the heat air current is supplied from the outer peripheral side of the sensor 100 toward the inside thereof, and the peripheral shape of the outer peripheral wall 231A of the stepped portion 231 of the control structure is elliptical. In this way, for example, it is possible to suppress variation in the temperature of the heat air current detected by the detection element 700 based on the direction in which the heat air current is supplied.

In addition, the detector 701 of the detection element 700 is disposed on the major axis 230 of the ellipse of the stepped portion 231 of the control structure and outside the outer peripheral wall 231A of the stepped portion 231. In this way, for example, the control structure can be used to reliably guide the heat air current to the detection element 700.

Further, the two detectors 701 of the detection element 700 are disposed outside the outer peripheral wall 231A of the stepped portion 231 so as to face each other with the control structure interposed therebetween. In this way, for example, it is possible to suppress variation in the temperature of the heat air current detected by at least one of the two detection elements 700 based on the direction in which the heat air current is supplied.

[Modifications to Embodiment]

Even though the embodiments according to the invention have been described above, the specific configuration and units of the invention may be modified and improved in any manner within the scope of the technical ideas of each invention described in the claims. Such modifications will be described below.

(With Regard to Problem to be Solved and Effect of Invention)

First, the problem to be solved by the invention and the effect of the invention are not limited to the above-described content, and the invention may solve a problem not described above or achieve an effect not described above. In addition, the invention may solve a part of the problem described above or achieve a part of the effect described above.

(With Regard to Labyrinth Portion)

Even though the case where the labyrinth portion 15 of FIG. 8 is provided on the outer cover 1 has been described in the above embodiment, the invention is not limited thereto. For example, the labyrinth portion 15 may be provided on the inner cover 2. Specifically, the labyrinth portion 15 may be formed integrally with the inner cover 2, or the separately formed labyrinth portion 15 may be fixed to the inner cover 2 using an adhesive, etc.

(With Regard to Outer Peripheral Wall)

In the embodiment, a description has been given of the case where the outer peripheral wall 231A has, for example, an elliptical circumferential shape in the front view as illustrated in FIG. 32, that is, the protrusion 23 has the elliptical shape in the front view. However, the invention is not limited thereto. For example, the outer peripheral wall 231A may be configured so that the peripheral shape is an oval other than a perfect circle in the front view. When this configuration is adopted as well, it is possible to suppress variation in the temperature of the heat air current detected by the detection element 700 based on the direction in which the heat air current is supplied.

(With Regard to Protrusion)

In the embodiment, as illustrated in FIG. 12, for example, the protrusion 23 has a shape that protrudes from the base portion 200 as a whole. However, the invention is not limited thereto. For example, the shape is any shape as long as the function of the stepped portion 231 described above is provided, and for example, only a configuration corresponding to the stepped portion 231 may be provided to the inner cover 2. In this case, with regard to the protrusion 23 of FIG. 12, a protruding portion corresponding to the stepped portion 231 may be provided on the circumference, and the inside of the protruding portion may be recessed so that a height position thereof becomes the same as that of the base portion 200.

(With Regard to Interpretation of Terms)

In the embodiment, the stepped portion 231 has been described as corresponding to the "control structure". However, for example, the protrusion 23 including the stepped portion 231 may be construed as corresponding to the "control structure".

(With Regard to Combination)

The features of the embodiment and the features of the modifications may be combined in any manner.

One embodiment of the present invention provides a fire detection apparatus comprises: a heat detection element configured to detect heat of a heat air current generated in association with a fire in a monitoring area, the heat detection element being disposed so that a detector protrudes from a predetermined base portion of the fire detection apparatus; and a control structure that has a stepped portion higher than the predetermined base portion, the control structure being configured to guide the heat air current to the detector of the heat detection element along an outer peripheral wall of the stepped portion, wherein at least a part of the detector of the heat detection element is located on a base portion side lower than the uppermost part of the stepped portion.

According to this embodiment, since the control structure is provided which includes the stepped portion higher than the base portion and guides the heat air current to the detector of the heat detection element along the outer peripheral wall of the stepped portion, for example, the heat air current can be reliably guided to the detection element.

Another embodiment of the present invention provides the fire detection apparatus according to the above embodiment, further comprises: a smoke detector configured to detect smoke in association with the fire, wherein the control structure has a labyrinth portion in which a plurality of partition walls is disposed to be erected with a gap therebetween from an upper surface of the stepped portion along an outer periphery of the stepped portion, the labyrinth portion guides the heat air current to the smoke detector provided inside the fire detection apparatus through the gap, and supplies particles of the smoke contained in an introduced heat air current to the smoke detector, and the labyrinth portion guides the heat air current to the detector of the heat detection element along a side end portion corresponding to an outer peripheral side of the stepped portion of the plurality of partition walls.

According to this embodiment, since the labyrinth portion is provided, the labyrinth portion guides the heat air current to the smoke detector provided inside the fire detection apparatus through the gap, supplies particles of the smoke contained in the introduced heat air current to the smoke detector, and guides the heat air current to the detector of the heat detection element along the side end portion corresponding to the outer peripheral side of the stepped portion of the plurality of partition walls, for example, it is possible to reliably guide the heat air current to the heat detection element and reliably supply smoke particles to the smoke detector of the fire detection apparatus, thereby improving fire detection accuracy.

Another embodiment of the present invention provides the fire detection apparatus according to the above embodiment, wherein the heat air current containing smoke introduced into the labyrinth portion is introduced to the smoke detector disposed in a lower part of the control structure via an opening penetrating the stepped portion of the control structure from an upper surface to a lower surface side.

According to this embodiment, since the heat air current containing smoke introduced into the labyrinth portion is introduced to the smoke detector disposed in a lower part of the control structure via an opening penetrating the stepped portion of the control structure from an upper surface to a lower surface side, for example, it is possible to reliably supply smoke particles to the smoke detector of the fire detection apparatus.

Another embodiment of the present invention provides the fire detection apparatus according to the above embodiment, wherein the heat air current is supplied from an outer peripheral side of the fire detection apparatus toward an inside thereof, and a peripheral shape of the outer peripheral wall of the stepped portion of the control structure is an ellipse or an oval.

According to this embodiment, since the heat air current is supplied from an outer peripheral side of the fire detection apparatus toward an inside thereof, and a peripheral shape of the outer peripheral wall of the stepped portion of the control structure is an ellipse or an oval, for example, it is possible to suppress variation in the temperature of the heat air current detected by the heat detection element based on the direction in which the heat air current is supplied.

Another embodiment of the present invention provides the fire detection apparatus according to the above embodiment, wherein the detector of the heat detection element is disposed on a major axis of an ellipse or an oval of the stepped portion of the control structure and on an outside of the outer peripheral wall of the stepped portion.

According to this embodiment, since the detector of the heat detection element is disposed on a major axis of an ellipse or an oval of the stepped portion of the control structure and on an outside of the outer peripheral wall of the stepped portion, for example, the control structure can be used to reliably guide the heat air current to the heat detection element.

Another embodiment of the present invention provides the fire detection apparatus according to the above embodiment, wherein two detectors of the heat detection element are disposed to face each other with the control structure interposed therebetween on the outside of the outer peripheral wall of the stepped portion.

According to this embodiment, since two detectors of the heat detection element are disposed to face each other with the control structure interposed therebetween on the outside of the outer peripheral wall of the stepped portion, for example, it is possible to suppress variation in the temperature of the heat air current detected by at least one of the two heat detection elements based on the direction in which the heat air current is supplied.

REFERENCE SIGNS LIST

1 Outer cover
2 Inner cover
3 Smoke detector cover
5 Smoke detector base
11 Main body
12 Top plate portion
13 Connecting portion
14 Opening
15 Labyrinth portion
16 Light guide opening
21 First opening
22 Second opening
23 Protrusion
24 Light guide opening
31 Opening
32 Light emitting-side housing
33 Light receiving-side housing
51 Light emitting-side housing
52 Light receiving-side housing
61 Insect screen
62 Board
63 Terminal board
64 Engaging metal fitting
71 Light emitting portion
72 Light receiving portion
73 Light guide
100 Sensor
151 Partition wall
151A Side end portion
152 Gap
200 Base portion
231 Stepped portion
231A Outer peripheral wall
230 Major axis
230A Minor axis
300 Detection space
700 Detection element
701 Detector
702 Terminal portion
703 Insulating film
711 Light emitting element
712 Light emitting-side optical element
721 Light receiving element
722 Light receiving-side optical element
801 Reference line
802 Reference line
803 Reference line
804 Reference line
805 Reference line
806 Reference line
807 Reference line
808 Reference line
809 Reference line

810 Reference line
811 Reference line
812 Reference line
813 Reference line
814 Reference line
815 Reference line
816 Reference line
817 Reference line
818 Reference line
819 Reference line
820 Reference line
821 Reference line
900 Ceiling

The invention claimed is:

1. A fire detection apparatus comprising:

a heat detection element configured to detect heat of a heat air current generated in association with a fire in a monitoring area, the heat detection element being disposed so that a detector protrudes from a predetermined base portion of the fire detection apparatus; and a control structure that has a stepped portion higher than the predetermined base portion, the control structure being configured to guide the heat air current to the detector of the heat detection element along an outer peripheral wall of the stepped portion, wherein at least a part of the detector of the heat detection element is located on a base portion side lower than the uppermost part of the stepped portion;

the fire detection apparatus further comprising a smoke detector configured to detect smoke in association with the fire, wherein the control structure has a labyrinth portion in which a plurality of partition walls is disposed to be erected with a gap therebetween from an upper surface of the stepped portion along an outer periphery of the stepped portion, the labyrinth portion guides the heat air current to the smoke detector provided inside the fire detection apparatus through the gap, and supplies particles of the smoke contained in an introduced heat air current to the smoke detector, and the labyrinth portion guides the heat air current to the detector of the heat detection element along a side end portion corresponding to an outer peripheral side of the stepped portion of the plurality of partition walls.

2. The fire detection apparatus according to claim 1, wherein the heat air current containing smoke introduced into the labyrinth portion is introduced to the smoke detector disposed in a lower part of the control structure via an opening penetrating the stepped portion of the control structure from an upper surface to a lower surface side.

3. The fire detection apparatus according claim 1, wherein the heat air current is supplied from an outer peripheral side of the fire detection apparatus toward an inside thereof, and a peripheral shape of the outer peripheral wall of the stepped portion of the control structure is an ellipse or an oval.

4. The fire detection apparatus according to claim 1, wherein the detector of the heat detection element is disposed on a major axis of an ellipse or an oval of the stepped portion of the control structure and on an outside of the outer peripheral wall of the stepped portion.

5. The fire detection apparatus according to claim 1, wherein two detectors of the heat detection element are disposed to face each other with the control structure interposed therebetween on the outside of the outer peripheral wall of the stepped portion.

* * * * *